United States Patent [19]

Fukasawa et al.

[11] Patent Number: 5,267,225
[45] Date of Patent: Nov. 30, 1993

[54] AUTOMATIC DISC PLAYER SYSTEM LOADED WITH A MULTIPLICITY OF SELECTABLE DISCS

[75] Inventors: Makoto Fukasawa, Tokyo; Shingo Funamoto, Sagamihara; Hajime Tanno, Kanagawa, all of Japan

[73] Assignee: Victor Company of Japan, Ltd., Yokohama, Japan

[21] Appl. No.: 841,479

[22] Filed: Feb. 26, 1992

[30] Foreign Application Priority Data

Feb. 26, 1991 [JP] Japan .................................. 3-53945
Feb. 26, 1991 [JP] Japan .................................. 3-53946
Feb. 26, 1991 [JP] Japan .................................. 3-53947

[51] Int. Cl.⁵ ........................................... G11B 17/22
[52] U.S. Cl. ..................................... 369/36; 369/192; 369/258; 369/270; 360/98.6
[58] Field of Search ............... 369/36, 191, 192, 206, 369/262, 258, 263, 270, 271, 34; 360/98.04, 98.06, 98.08, 99.05, 99.12

[56] References Cited

U.S. PATENT DOCUMENTS

| 4,614,474 | 9/1986 | Sudo ................................ 369/36 |
| 4,730,292 | 3/1988 | Hasegawa et al. ................ 369/36 |
| 4,951,277 | 8/1990 | Masunaga et al. ............... 369/270 |
| 5,001,582 | 3/1991 | Numasaki .......................... 369/36 |

FOREIGN PATENT DOCUMENTS 0351221 1/1990 European Pat. Off.
3328328 2/1984 Fed. Rep. of Germany.
3439352 5/1985 Fed. Rep. of Germany.
1-50289 2/1989 Japan .................................. 369/270
2-308466 12/1990 Japan .................................. 369/270

Primary Examiner—Stuart S. Levy
Assistant Examiner—Joseph A. Rhoa
Attorney, Agent, or Firm—Pollock, VandeSande & Priddy

[57] ABSTRACT

An automatic disc playback system for playing back discs such as compact discs or the like includes a pair of juxtaposed racks each housing a plurality of trays (3) with respective discs (4) placed thereon, a disc playback unit (120, 121) for playing back any one, at a time, of the discs, and a disc feed unit (40) disposed between the racks and movable therealong the racks, for feeding any one, at a time, of the discs from the racks to the disc playback unit. The disc feed unit has a disc drawing mechanism (60) for drawing a tray with a disc placed thereon from the rack, holding the disc, returning the tray into the rack before the disc is fed from the rack to the disc playback unit by the disc feed unit. The disc feed unit (40) also has a disc attracting mechanism (90) including a first iron member (109) movable upwardly through the central hole of the tray into engagement with the disc around the central hole thereof, and an electromagnetic attracting assembly (110-112) movable downwardly for magnetically attracting the first iron member (109) together with the disc engaged thereby.

4 Claims, 16 Drawing Sheets

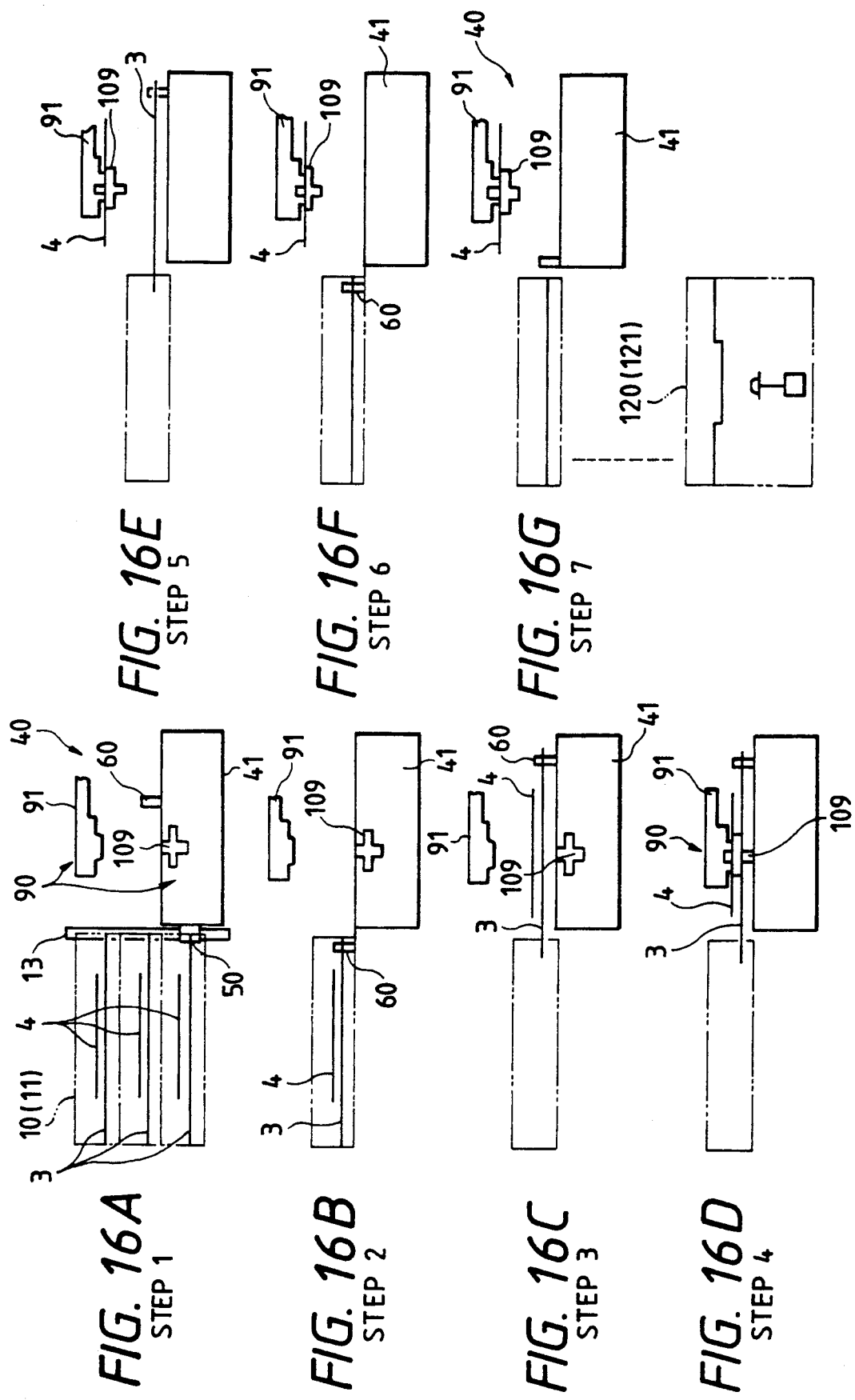

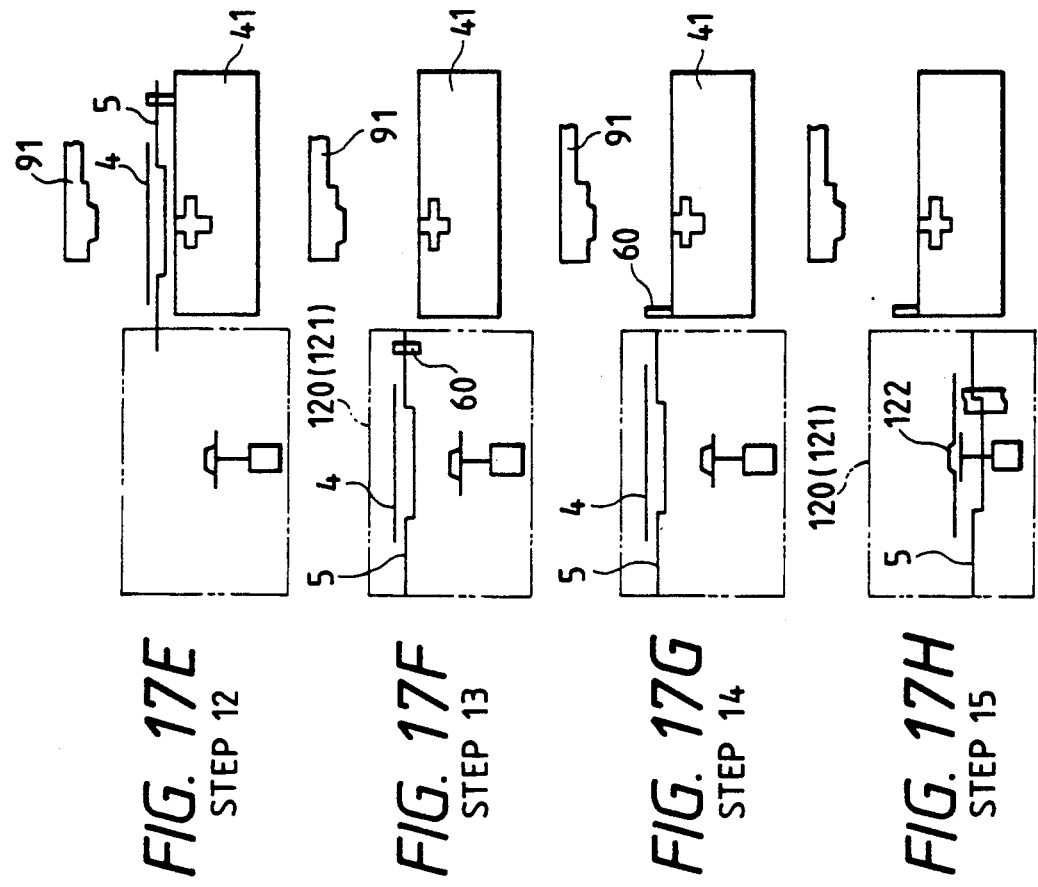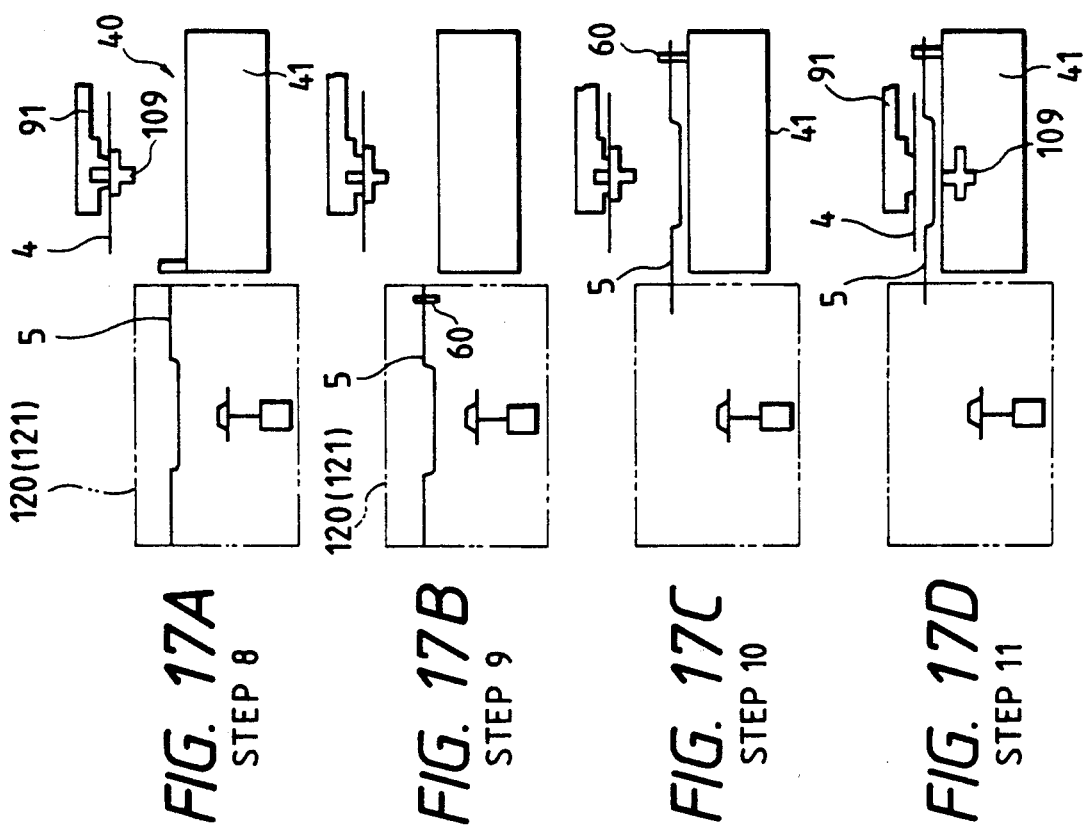

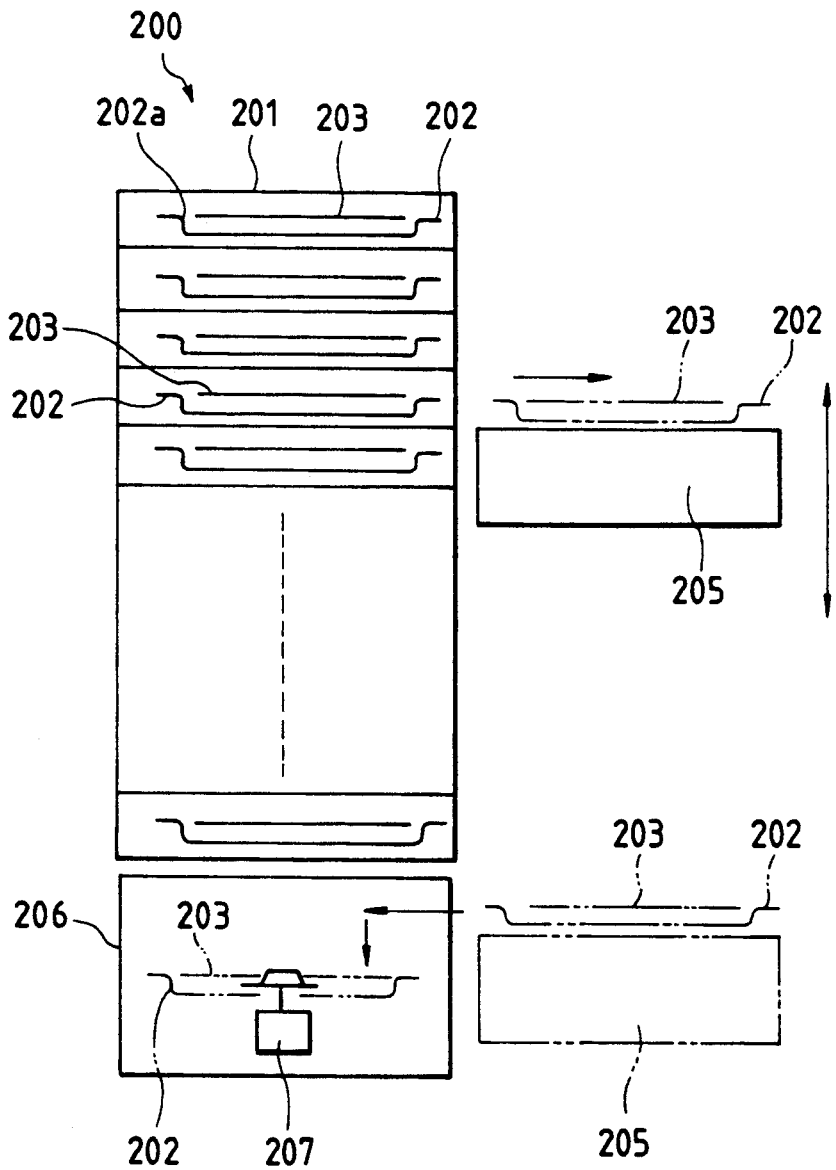

AUTOMATIC DISC PLAYER SYSTEM LOADED WITH A MULTIPLICITY OF SELECTABLE DISCS

BACKGROUND OF THE INVENTION

1. Field of the Invention:

The present invention relates to an automatic disc playback system for drawing a desired disc on a tray from a rack, which houses a multiplicity of discs placed on respective trays, into a disc feed unit, taking the disc from the tray, returning the tray into its storage position in the rack, moving the disc feed unit with the disc held thereon to a disc playback unit, and then loading the disc from the disc feed unit into the disc playback unit for reproducing audio, video, and/or character information recorded on the disc.

2. Description of the Prior Art:

There have recently been developed various automatic disc playback systems for selecting a desired disc from a multiplicity of loaded discs and automatically playing back the selected disc with a disc playback unit.

FIG. 18 of the accompanying drawings shows one such conventional automatic disc playback system loaded with a multiplicity of selectable discs. The automatic disc playback system, generally designated by the reference numeral 200, has a single rack 201 housing a number of discs 203 placed on respective trays 202. The trays 202 have respective circular recesses 202a for receiving the respective discs 203 therein, the recesses 202a having respective outer circular steps for engaging the respective outer circumferential edges of the discs 203 to hold the discs 203 in position on the trays 202. The automatic disc playback system 200 also includes a vertically movable disc feed unit 205 that is positioned on one side of the rack 201.

In operation, the disc feed unit 205 is brought into a position in front of a desired disc 203 placed on its tray 202, and the desired disc 203 is drawn, together with the tray 202, out of the rack 200 onto the disc feed unit 205. The disc feed unit 205, which supports the disc 203 on the tray 202, is then lowered to a position adjacent to a disc playback unit 206 disposed beneath the rack 201. The disc 203 is then inserted, along with the tray 202, from the disc feed unit 205 into the disc playback unit 206. In the disc playback unit 206, the disc 203 on the tray 202 is placed on a turntable 207, and rotated by the turntable 207 and played back to reproduce the recorded information.

The disc 203 that is desired to be played back is always accompanied by the corresponding tray 202 when it is withdrawn from the rack 201, carried by the disc feed unit 205, inserted into the disc playback unit 206, and played back thereby. To allow the disc 203 placed on the tray 202 to be reliably returned into its storage position in the rack 201, the trays 202 should be spaced at relatively large intervals or distances in the rack 201. However, increasing the intervals or distances between the trays 202 in the rack 201 results in a reduction in the disc storage capacity of the rack 201. Stated otherwise, it is necessary to increase the height of the rack 201 in order to increase the disc storage capacity of the rack 201. It would be possible to minimize the distances between the trays 202 by highly accurately controlling the position of disc feed unit 205 as it moves. However, a highly complex control mechanism would be required and it would be difficult to move the disc feed unit 205 at high speeds. Another problem is that when the tray 202 and the disc 203 placed thereon are fed by the disc feed unit 205, the tray 202 and the disc 203 may be vibrated, and hence may possibly be displaced in position and/or damaged.

The rack 201 has tray locking means (not shown) for locking the trays 202 in the rack 201. Since the tray locking means are associated with the trays 202, respectively, it is also necessary to keep the distances between the trays 202 wide enough to accommodate the tray locking means, thus limiting the disc storage capacity of the rack 201. The tray locking means that are combined with the respective trays 202 are constructed of a large number of parts, which make the automatic disc playback system 200 highly costly.

Each of the trays 202 can hold only one disc 203 in position thereon because the disc 203 is positioned only by the circular step around the recess 202a which engages the outer circumferential edge of the disc 203. The automatic disc playback system 200 is limited in its use as the rack 201 cannot store different types of discs having different outside diameters.

Two discs of different outside diameters may be placed on a tray which has two concentric circular recesses having respective outer circular steps for engaging the respective outer circumferential edges of the discs. Inasmuch as the two concentric circular recesses have respective bottom surfaces lying at different levels, the tray is relatively thick. Therefore, a rack loaded with a number of such trays has a limited disc storage capacity.

The applicant has proposed an automatic disc playback system with a plurality of juxtaposed racks for increased disc storage capacity, as disclosed in Japanese patent application No. 2-262387.

SUMMARY OF THE INVENTION

It is an object of the present invention to provide an automatic disc playback system for reliably feeding only a desired disc from a rack to a disc playback unit.

Another object of the present invention is to provide an automatic disc playback system which can store a large number of discs in racks.

Still another object of the present invention is to provide an automatic disc playback system which is highly reliable in operation and has a relatively low electric power requirement.

Yet still another object of the present invention is to provide an automatic disc playback system which has a tray unlocking mechanism that is relatively simple in structure, can be installed in a small space, and can easily be controlled in operation.

A further object of the present invention is to provide an automatic disc playback system which has a tray drawing mechanism that is relatively simple in structure, can be installed in a small space, and can easily be controlled in operation.

A still further object of the present invention is to provide an automatic disc playback system which has a tray locking mechanism that is constructed of a relatively small number of components and can be installed in a small space.

A yet still further object of the present invention is to provide an automatic disc playback system having a plurality of relatively thin trays each capable of carrying one of discs of different diameters at a time.

According to the present invention, there is provided an automatic disc playback system comprising a rack housing a plurality of trays with respective discs placed thereon, each of the trays having a central hole and each of the discs having a central hole aligned with the central hole of the tray, a disc playback unit for playing back any one, at a time, of the discs, and a disc feed unit movable along the rack for feeding any one, at a time, of the discs from the rack to the disc playback unit, the disc feed unit comprising disc drawing means for drawing a tray with a disc placed thereon from the rack, holding the disc, returning the tray into the rack before the disc is fed from the rack to the disc playback unit by the disc feed unit, disc attracting means including a first iron member movable upwardly through the central hole of the tray into engagement with the disc around the central hole thereof, and electromagnetic attracting means movable downwardly for magnetically attracting the first iron member together with the disc engaged thereby.

According to the present invention, there is also provided an automatic disc playback system comprising first and second racks disposed in confronting relationship to each other, each of the first and second racks housing a plurality of trays with respective discs placed thereon, a disc playback unit for playing back any one, at a time, of the discs, a disc feed unit disposed between the first and second racks and movable therealong, for feeding any one, at a time, of the discs from one of the first and second racks to the disc playback unit, tray locking means disposed on the first and second racks, respectively, in confronting relationship to each other, each for locking a number of trays together in the rack, and tray unlocking means disposed on the disc feed unit and having a single drive source, for releasing one, at a time, of the tray locking means on the first and second racks.

According to the present invention, there is further provided an automatic disc playback system comprising first and second racks disposed in confronting relationship to each other, each of the first and second racks housing a plurality of trays with respective discs placed thereon, the trays in the first and second racks having confronting clampable members, respectively, a disc playback unit for playing back any one, at a time, of the discs, and a disc feed unit disposed between the first and second racks and movable therealong, for feeding any one, at a time, of the discs from one of the first and second racks to the disc playback unit, the disc feed unit comprising disc drawing means for clamping the clampable member of a tray with a disc placed thereon in one of the first and second racks and drawing the tray the one of the first and second racks.

According to the present invention, there is also provided an automatic disc playback system comprising a rack housing a plurality of trays with respective discs placed thereon, a disc playback unit for playing back any one, at a time, of the discs, and a disc feed unit movable along the rack for feeding any one, at a time, of the discs from the rack to the disc playback unit, the disc feed unit comprising guide means for guiding only the tray with the one of the discs out of the tray, and stopper means for holding the other trays with the other discs placed thereon within the rack.

According to the present invention, there is also provided an automatic disc playback system comprising a rack housing a plurality of trays with respective discs placed thereon, a disc playback unit for playing back any one, at a time, of the discs, a disc feed unit movable along the rack for feeding any one, at a time, of the discs from the rack to the disc playback unit, the disc feed unit having a tray unlocking bar, and a lock lever angularly movably mounted on the rack, the lock member having a first arm for locking a number of trays together in the rack, and a second arm joined to the first arm and engageable by the tray unlocking bar for causing the first arm to unlock the According to the present invention, there is further provided an automatic disc playback system comprising a rack housing a plurality of trays capable of supporting discs of different diameters, the discs having aligned central holes, respectively, of the same diameter, a disc playback unit for playing back any one, at a time, of the discs, and a disc feed unit movable along the rack for feeding any one, at a time, of the discs from the rack to the disc playback unit, each of the trays having a guide rib projecting from an upper surface thereof and positionable in the central hole of any one of the discs, whereby the discs of different diameters can be positioned on the trays by the guide ribs thereof.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 16A through 16G are schematic views showing the manner in which the automatic disc playback system operates;

FIGS. 17A through 17H are schematic views also showing the manner in which the automatic disc playback system operates; and FIG. 18 is a schematic view of a conventional automatic disc playback system with a multiplicity of loaded discs.

DETAILED DESCRIPTION OF THE PREFERRED EMBODIMENT

Figure 1:
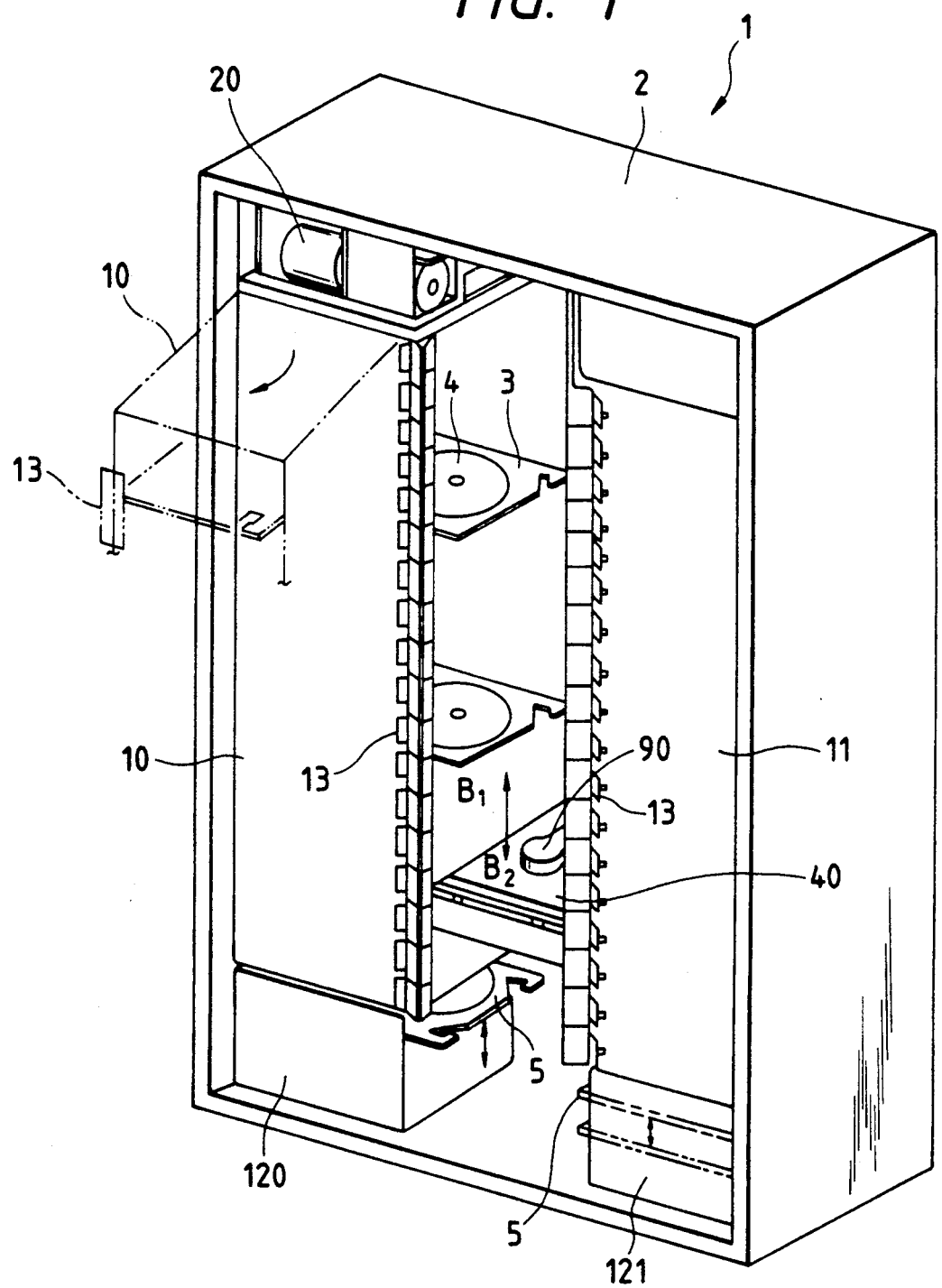
FIG. 1 is a perspective view of an automatic disc playback system loaded with a multiplicity of selectable discs according to the present invention.

General system arrangement:

As shown in FIG. 1, an automatic disc playback system, generally designated by the reference numeral 1, according to the present invention comprises a housing 2, two juxtaposed vertical racks 10, 11 positioned in the housing 2, a disc feed unit 40 disposed in the housing 2 between the racks 10, 11 and vertically movable for feeding a desired disc 4, two juxtaposed disc playback units 120, 121 disposed in the housing 2 below the respective racks 10, 11, and a disc feed unit driving mechanism 20 disposed in the housing 2 above the rack 10.

The racks 10, 11 are laterally spaced apart from each other and each house a multiplicity of discs 4 placed on respective rack trays 3 that are designed for use with the racks 10, 11. The discs 4 may be audio or video discs, for example, which store various information such as audio, video, and/or character information recorded thereon.

The disc feed unit 40 draws a tray 3 with a desired disc 4 placed thereon from the rack 10 or 11, holds only the disc 4 with a disc attracting mechanism 90, returns the tray 3 back to its storage position in the rack 10 or 11, and then feeds the disc 4 for playback.

Each of the disc playback units 120, 121 plays back a disc 4 that has been fed by the disc feed unit 40 and placed on a disc playback unit tray 5 which is designed for use with the disc playback units 120, 121.

The disc feed unit driving mechanism 20 vertically moves the disc feed unit 40 in a vertically elongate space between the racks 10, 11 from a desired position aligned with a desired disc 4 stored in the rack 10 or 11 to the disc playback unit 120 or 121, and vice versa.

Racks 120, 121 and rack trays 3:

The racks 120, 121 are substantially symmetrical in shape. Since the racks 120, 121 are basically identical in structure, only the rack 120 will be described in detail below with reference to FIG. 2.

Figure 2:
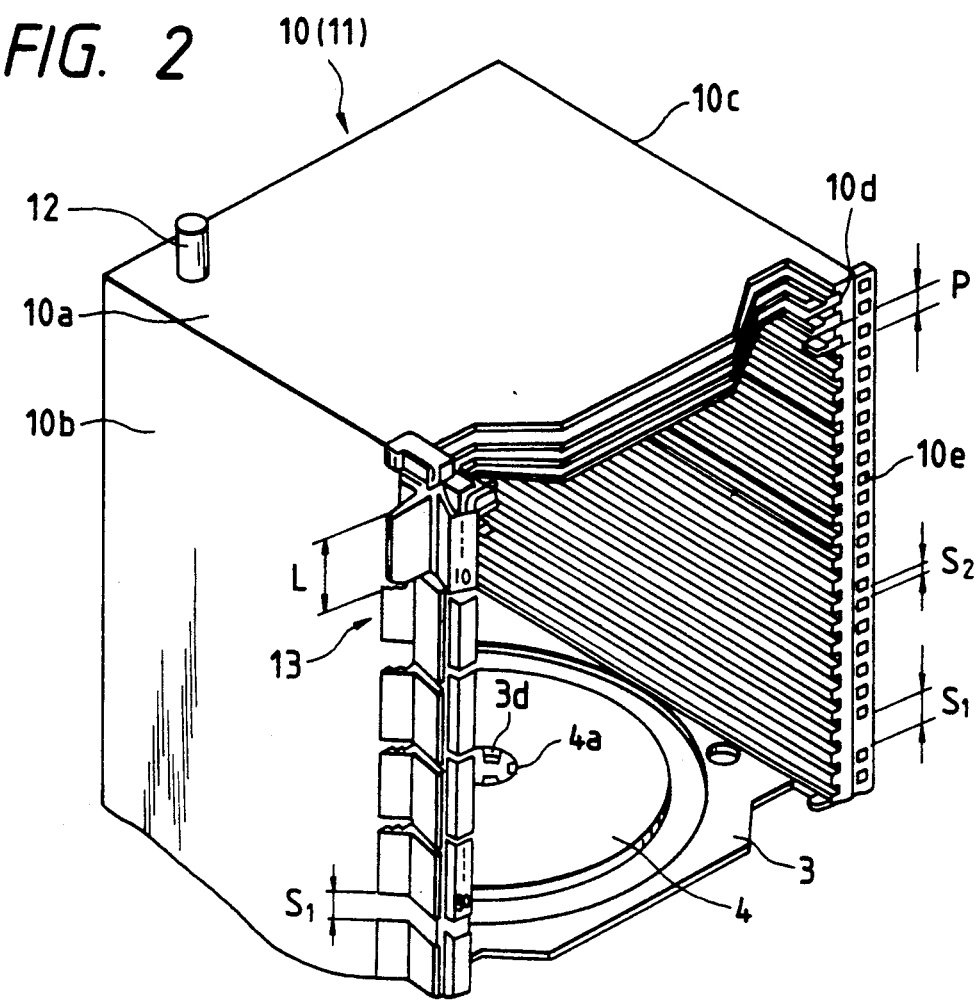
FIG. 2 is a fragmentary perspective view of a rack of the automatic disc playback system.

In FIG. 2, the rack 10 is in the form of a vertically elongate box having a vertical shaft 12 fixed to an upper panel 10a and a lower panel (not shown in FIG. 2), respectively, at corners thereof. The vertical shaft 12 has upper and lower projecting ends pivotally supported in the housing 2 such that the rack 10 is angularly movable about the shaft 12 from the stored position in the housing 2 to a projected position out of the housing 2 as indicated by the two-dot-and-dash lines in FIG. 1. When the rack 10 is in the projected position, desired discs 4 can manually be placed on trays 3 in the rack 10. The rack 10 is also detachably supported in the housing 2, so that the rack 10 and any discs 4 and trays 3 stored therein can be removed from the housing 2.

As shown in FIG. 2, the rack 10 has a pair of side panels 10b, 10c with a plurality of horizontal grooves 10d defined in their confronting inner surfaces. Only the grooves 10d on the righthand side panel 10c (as viewed in FIG. 2) are illustrated in FIG. 2. The distance or pitch between any adjacent two of the grooves 10d is of a small value of 3 mm. The trays 3 with the corresponding discs 4 placed thereon are successively stored as a vertical stack in the rack 10, with the opposite marginal side edges of the trays 3 being received in the horizontal pairs of the grooves 10d. For example, about 200 discs 4 are placed on the respective trays 3 and stored in the rack 10. The stored discs 4 are grouped into four blocks each composed of 50 discs 4, with a large gap $S_1$ left between the adjacent blocks, e.g., between the 50th and 51th discs 4.

Figure 3:
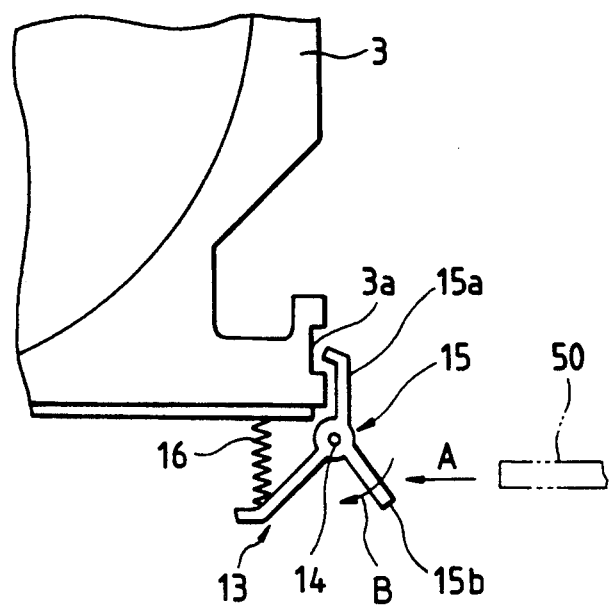
FIG. 3 is a fragmentary plan view of a tray locking mechanism.

A plurality of tray locking mechanisms 13 for locking the trays 3 in the grooves 10d are arranged in a vertical array on the front edge of the lefthand side panel 10b. Each of the tray locking mechanisms 13 has a length L large enough to lock ten trays 3 together, for example. Each tray locking mechanism 13 is dimensioned to lock plural trays 3 together because since the adjacent trays 3 are closely spaced as described above, a complete set of any tray locking mechanisms for individually locking trays 3 would be too complex and large to be mounted on the side panel 10b. As shown in FIG. 3, each tray locking mechanism 13 comprises a lock lever 15 angularly movably supported on a vertical shaft 14, the lock lever 15 having a hooked arm 15a and an actuating arm 15b angularly spaced therefrom. The lock lever 15 is normally urged to turn counterclockwise (FIG. 3) by a compression spring 16 for keeping the hooked end of the hooked arm 15a in a recess 3a defined in front edges of the trays 3, thus locking the trays 3 in the grooves 10d, i.e., in the rack 10d. To unlock the trays 3, a tray unlocking mechanism 50 (described later on) of the disc feed unit 40 is moved in the direction indicated by the arrow A to push the actuating arm 15b, thereby turning the lock lever 15 counterclockwise in the direction indicated by the arrow B against the bias of the compression spring 16 until the hooked arm 15a is released from the trays 3. The tray locking mechanism 13 may also be unlocked manually by the user.

The disc feed unit 40 has tray stoppers 41d (see FIG. 6) for preventing those unlocked trays 3 other than an unlocked tray 3 which carries a desired disc 4, from being transferred to the disc feed unit 40.

The rack 11 also has a plurality of tray locking mechanisms 13 positioned in confronting relationship to the tray locking mechanisms 13 on the rack 10.

Since a plurality of trays 3 can simultaneously be locked in the racks 10, 11 by each of the tray locking mechanisms 13, the entire tray locking mechanisms 13 are relatively simple in structure, are constructed of a relatively small number of parts, and hence can be mounted free of space limitations.

The righthand side panel 10c has a vertically array of rectangular position detecting holes 10e defined in its front edge. The position detecting holes 10e correspond respectively to the trays 3 stored in the rack 10d for detecting the respective positions of the trays 3. Any adjacent two of the position detecting holes 10e are spaced from each other by a distance or gap $S_2$ smaller than the distance $S_1$. The position detecting holes 10e cooperate with photosensors 42 (see FIG. 6) on the disc feed unit 40 in positioning the disc feed unit 40 when a tray 3 with a desired disc 4 thereon is to be selected.

The rack tray 3 will be described below with reference to FIGS. 4A and 4B.

The tray 3 is in the form of a unitary thin board molded of synthetic resin and having a small thickness T of about 1.5 mm. The tray 3 has a circular central hole 3b defined therein, a pair of rectangular holes 3c defined on diametrically opposite sides of and communicating with the circular central hole 3b, and a pair of diametrically opposite guide ribs 3d projecting upwardly from the upper surface of the tray 3 at the edge of the circular central hole 3b, the guide ribs 3d serving to position the disc 4 on the tray 3. When the disc 4 is placed on the tray 3, the guide ribs 3d are inserted into a central hole 4a defined in the disc 4 thereby reliably positioning the disc 4 on the tray 3. Since the disc 4 is not positioned with respect to its outer circumferential edge, it is possible to place any of discs having different outside diameters on the tray 3. More specifically, as shown in FIG. 4B, discs 4A, 4B of different outside diameters have central holes 4a of the same diameter, and can properly be positioned on the tray 3 by the guide ribs 3d that are inserted into the central holes 4a. The larger-diameter disc 4A may for example be a known compact disc (CD) having an outside diameter of 12 cm, and the smaller-diameter disc 4B may for example be a known CD having an outside diameter of 8 cm. Also, various CDs, VDs (video discs), or the like having different outside diameters may be placed on the tray 3.

The tray 3 further has diametrically opposite pairs of holes 3e, 3f for detecting the diameter of the disc 4 placed on the tray 3. The holes 3e are positioned radially inwardly of the holes 3f. Therefore, the holes 3e are used to detect the diameter of a smaller-diameter disc, and the holes 3f are used to detect the diameter of a larger-diameter disc. When a tray 3 with a disc 4 thereon is drawn from the rack onto the disc feed unit 40, the disc 4 is optically detected by photosensors (not shown) in the disc feed unit 40 which are positioned in confronting relationship to the holes 3e, 3f.

As described above, the rack tray 3 can carry discs of different outside diameters, and the disc 4 placed on the tray 3 is positioned with respect to its central hole 4a, but not its outer circumferential edge. The tray 3 may be of a much smaller thickness than the conventional tray with disc-receiving recesses of different diameters at different levels. Accordingly, an increased number of trays 3 with respective discs 4 carried thereon can be stored in the racks 10, 11, and the automatic disc playback system 1 is not unduly limited in use as it can play back various discs of different diameters.

The circular central hole 3b and the rectangular holes 3c of the tray 3 are shaped so that a disc catcher 109 of a disc attracting mechanism 90 (see FIG. 10) can be inserted therethrough. If a tray 3 is intended to carry only one type of disc 4, not discs of different outside diameters, then the tray 3 may be dispensed with the guide ribs 3d and have a recess for receiving the disc 4 and positioning the same with the outer step thereof, and the central hole 3b may be large enough to allow the disc catcher 109 to enter therein.

Figure 4A:
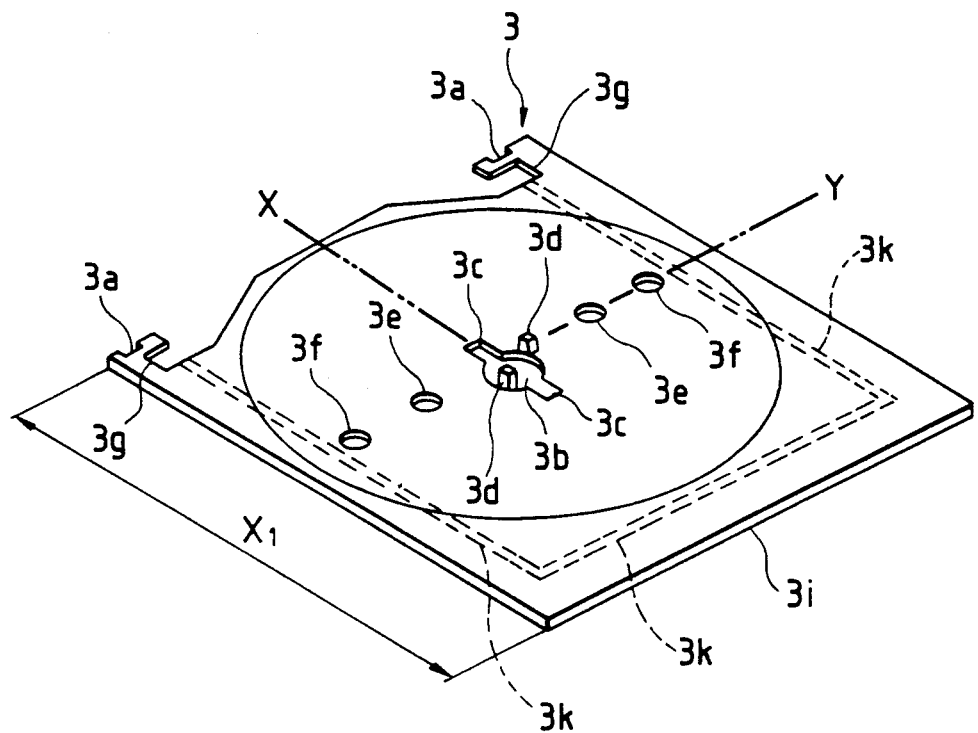
FIG. 4A is a perspective view of a tray for the rack.

As shown in FIG. 4A, the tray 3 has a pair of hook-shaped clampable members 3g on its front end at opposite sides thereof for drawing the tray 3 from the rack 10 or 11. The clampable members 3g are symmetrical in shape so that the tray 3 can be used with either the tray 10 or 11. The tray 3 can be drawn onto the disc feed unit 40 or returned into its storage position in the rack 10 or 11 by a tray drawing mechanism 60 (see FIG. 8), as described later on.

Figure 4B:
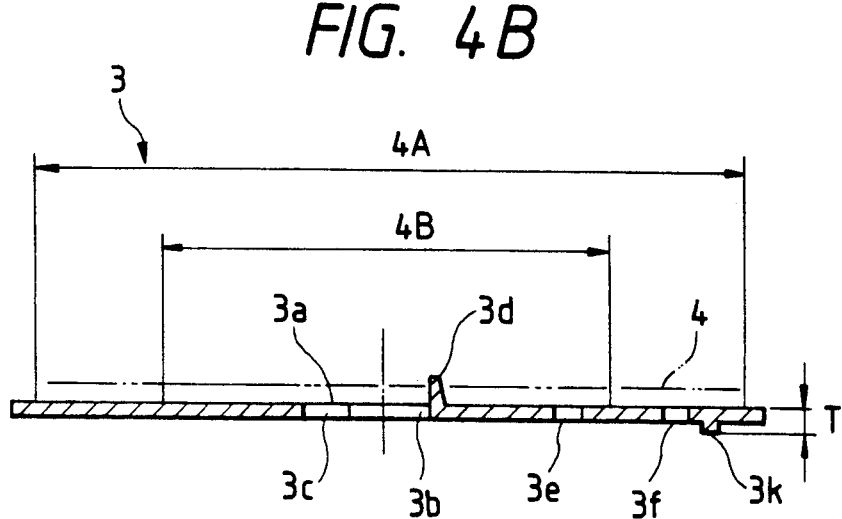
FIG. 4B is a cross-sectional view taken along line IV—IV of FIG. 4A.

As shown in FIG. 4B, the tray 3 has a relatively low rib 3k projecting downwardly from the lower surface thereof, the rib 3k having a height of about 0.3 mm. The rib 3k is formed only partly on the lower surface of the tray 3, but does not extend fully around the tray 3. The rib 3k serves to prevent adjacent closely spaced trays 3 from sticking to each other due to moisture in the air or static electricity. Accordingly, only a tray 3 with a desired disc 4 placed thereon can reliably be pulled out of the rack 10 or 11 onto the disc feed unit 40, without dragging other trays. The automatic disc playback system 1 is therefore highly reliable in disc retrieval operation.

The tray 3 has a length $X_1$ (FIG. 4A) between its front and rear ends, the length $X_1$ being selected such that the rear end of the tray 3 will not be fully displaced out of the corresponding grooves 10d in the rack 10 or 11 when the tray 3 is drawn onto the disc feed unit 40. Since the rear end of the tray 3 is always retained in the associated grooves 10d, the tray 3 can easily be returned to its storage location in the rack 10 or 11 without fail.

Figure 5:
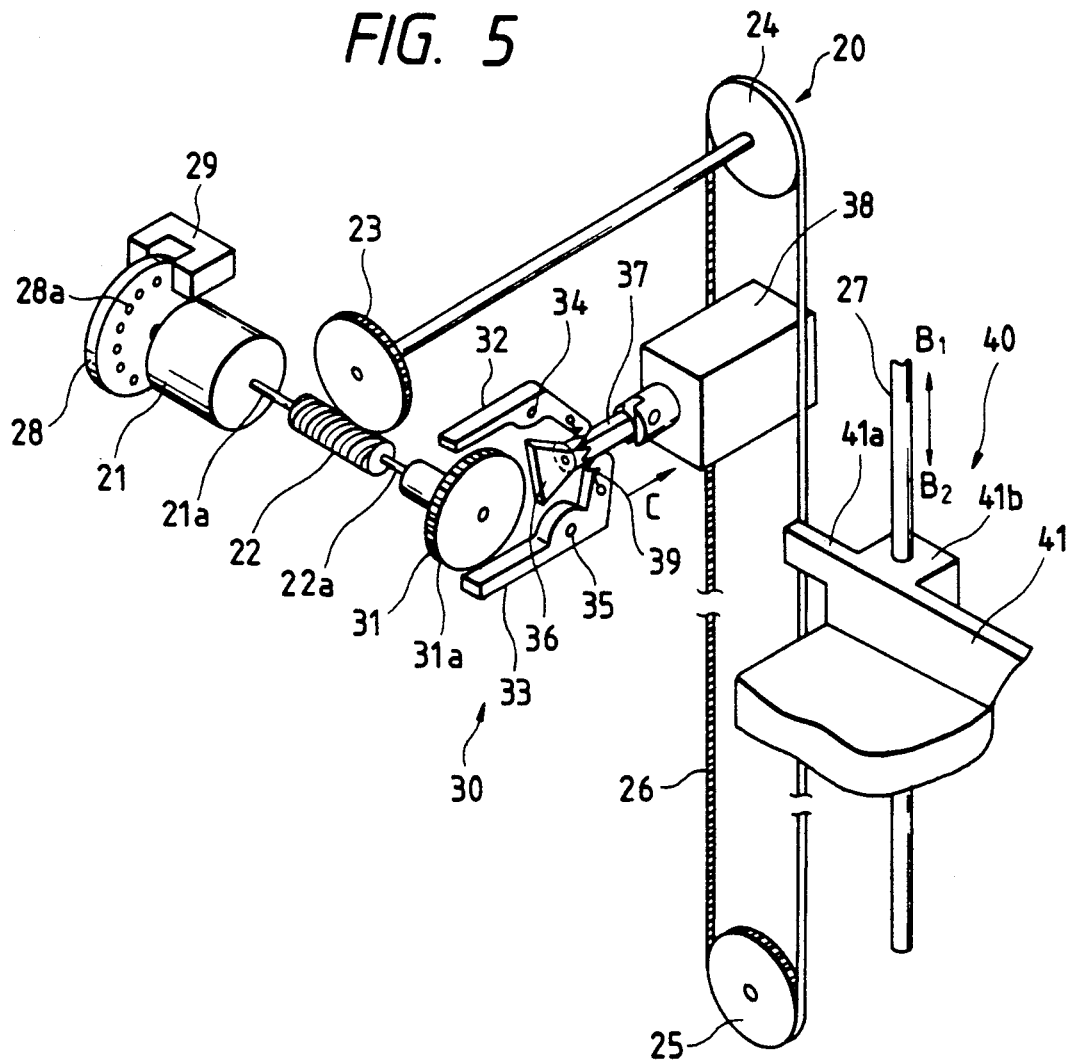
FIG. 5 is a perspective view of a disc feed unit driving mechanism.

Disc feed unit driving mechanism 20:

FIG. 5 shows the disc feed unit driving mechanism 20 in detail. Prior to describing the disc feed unit 40, the disc feed unit driving mechanism 20 serving as a drive source for driving the disc feed unit 40 will first be described below.

The disc feed unit driving mechanism 20 is disposed above the lefthand rack 10 in the housing 2 as shown in FIG. 1. The disc feed unit driving mechanism 20 moves the disc feed unit 40 vertically in the directions indicated by the arrows $B_1$, $B_2$. As shown in FIG. 5, the disc feed unit driving mechanism 20 has a motor braking mechanism 30 for stopping the disc feed unit 40 in a desired position along the rack 10 or 11.

In the disc feed unit driving mechanism 20, the rotation of a motor 21 is transmitted from a worm 22 fixed to a motor shaft 21a to a worm wheel 23, from which the rotation is transmitted to a timing pulley 24 coaxially coupled to the worm wheel 23 and positioned in an upper portion of the housing 2. A timing belt 26 is trained under tension around the timing pulley 24 and another timing pulley 25 rotatably supported in a lower portion of the housing 2, the timing belt 26 being joined to a joint arm 41a of a feed base 41 of the disc feed unit 40. The feed base 41 also has a slider 41b slidably fitted over a vertical elongate shaft 27 that extends along the timing belt 26. The feed base 41 also has a guide (not shown) on its righthand end (as viewed in FIG. 5) for guiding the feed base 41 along the shaft 27.

When the motor 21 is energized, the feed base 41 is vertically moved along the shaft 27 by the timing belt 26. To the motor shaft 21a, there is fixed a disc 28 with a circular array of holes 28a defined therein behind the motor 21. The motor 21 is controlled by pulses produced by a photosensor 29 which optically detects the holes 28a of the disc 28. The control of the motor 21 based on the pulses produced by the photosensor 29 will be described later on with respect to the disc feed unit 40.

The worm 22 has a shaft 22a projecting remotely from the motor 21, and a brake disc 31, which is part of the motor braking mechanism 30, is coaxially coupled to the shaft 22a. The brake disc 31 has an outer circumferential surface 31a knurled or machined into spur gear teeth. Two angular brake levers 32, 33 are angularly movably supported on respective shafts 34, 35 in confronting relationship to each other on opposite sides of the brake disc 31. The angular brake leers 32, 33 have distal ends frictionally engageable with the outer circumferential surface 31a of the brake disc 31. Between the other ends of the angular brake levers 32, 33, there are disposed a triangular block 36 and a connecting rod 37 connected to the triangular block 36. The connecting rod 37 is joined to the plunger of a solenoid 38. The other ends of the angular brake levers 32, 33 confront each other and are engageable with the block 36 or the connecting rod 37. The block 36 is swingably mounted on the connecting rod 37. A tension spring 39 is connected between the angular brake levers 32, 33 near the other ends thereof for normally urging the brake leers 32, 33 in a direction to displace the distal ends thereof out of engagement with the outer circumferential surface 31a of the brake disc 31. When the solenoid 38 is not energized, i.e., when the motor 21 is energized, the plunger of the solenoid 38 is projected in a direction opposite to the direction indicated by the arrow C, and the other ends of the brake levers 32, 33 are held against the connecting rod 37 under the tension of the tension spring 39, thus holding the distal ends of the brake levers 32, 33 out of engagement with the outer circumferential surface 31a of the brake disc 31. When the motor 21 is de-energized and the solenoid 38 is energized to pull the plunger in the direction C, the other ends of the brake levers 32, 33 are engaged and displaced outwardly by the triangular block 36, turning the brake lever 32 counterclockwise about the shaft 34 against the bias of the tension spring 39 and also turning the brake lever 33 blockwise about the shaft 35 against the bias of the tension spring 39. Therefore, the distal ends of the brake levers 32, 33 are brought into engagement with the outer circumferential surface 31a under equal forces, for reliably braking the motor 21 and the brake disc 31 against rotation. Since the block 36 is pivotally mounted on the connecting rod 37, it is automatically balanced in position when engaging the other ends of the brake leers 32, 33, and the distal ends of the brake levers 32, 33 are uniformly held in engagement with the outer circumferential surface 31a without imposing any localized loads thereon. The knurled or tooth-shaped outer circumferential surface 31a of the brake disc 31 provide a relatively large coefficient of friction when they engage the distal ends of the brake levers 32, 33. Consequently, when the distal ends of the brake levers 32, 33 engage the outer circumferential surface 31a of the brake disc 31, the motor 21 and the brake disc 31 are reliably braked against rotation, thus stopping the disc feed unit 40 reliably and accurately in any desired location.

The worm 22 and the worm wheel 23 that are held in mesh with each other and the motor braking mechanism 3 as it is actuated, are combined to exert effective braking forces to stop the disc feed unit 40 reliably at a desired position against gravity even though the disc feed unit 40 is relatively heavy.

The outer circumferential surface 31a of the brake disc 31 may not be knurled or machined into spur gear teeth, but frictional members as of rubber may be bonded to the distal ends of the brake levers 32, 33 for frictional engagement with the outer circumferential surface 31a.

Disc feed unit 40:

The disc feed unit 40, which is a central feature of the present invention, will be described below with reference to FIGS. 6 through 12A-12D.

Figure 6:
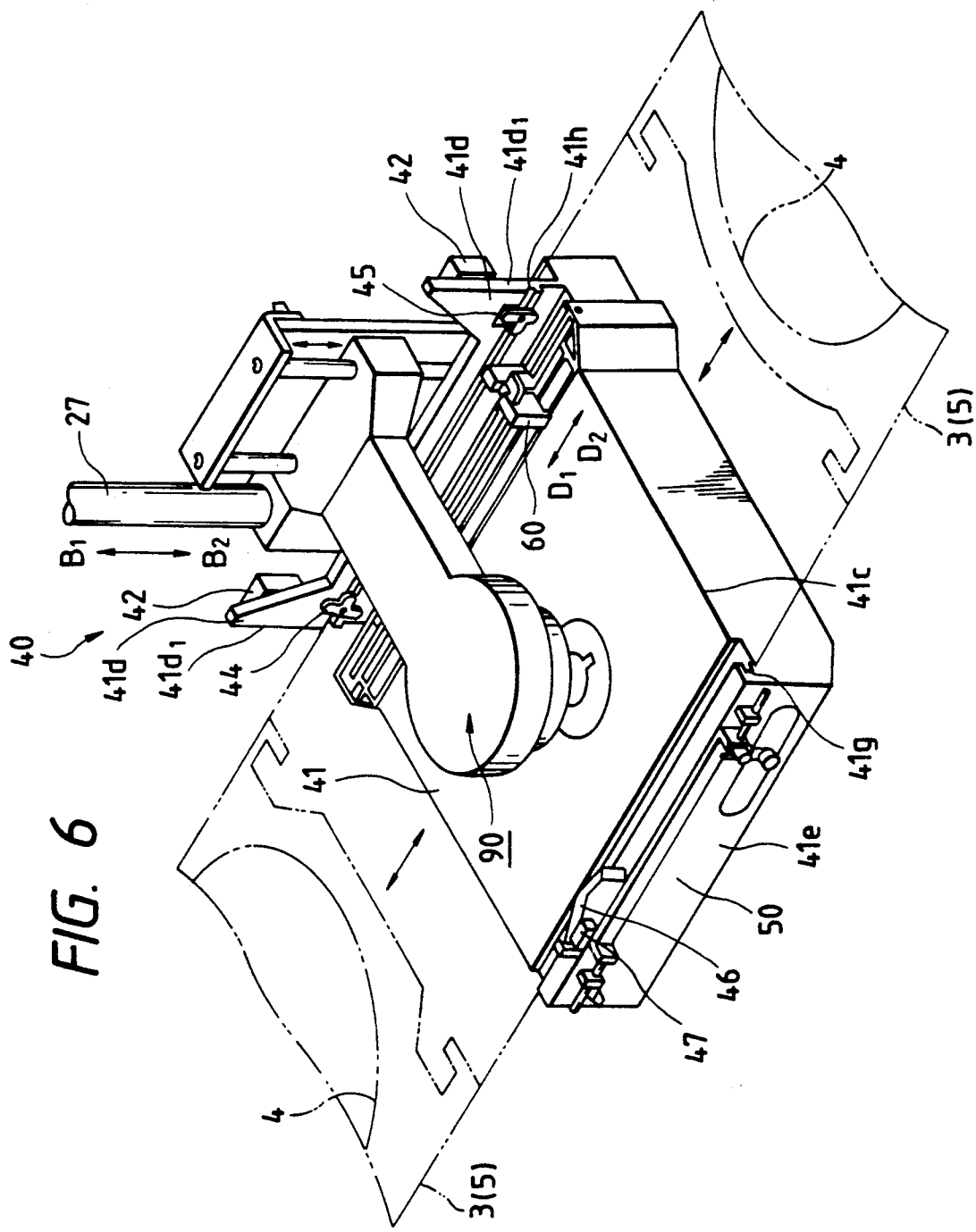
FIG. 6 is a perspective view of a disc feed unit.

As shown in FIG. 6, the disc feed unit 40, which is vertically movable along the shaft 27, primarily comprises a tray unlocking mechanism 50 for releasing the tray locking mechanisms 13 on the racks 10, 11, guide grooves 41g, 41h and tray stoppers 41d for drawing only a tray 3 with a desired disc 4 placed thereon from the rack 10 or 11, a tray drawing mechanism 60 for drawing a rack ray from the rack 10 or 11, or a disc playback unit tray 5 from the disc playback unit 120 or 121 onto the disc feed unit 40, and also for returning a tray 3 or 5 back to its storage positioned in the rack 10 or 11 or the disc playback unit 120 or 121, and a disc attracting mechanism 90 for attracting a disc 4 placed on a try 3 or 5.

The tray unlocking mechanism 50, the guide grooves 41g, 41h and the tray stoppers 41d, and the tray drawing mechanism 60 are shown as being provided on the disc feed unit 40 in the present embodiment. However, the present invention is also applicable to an automatic disc playback system of the type in which a tray 3 with a desired disc 4 placed thereon is removed from the rack 10 or 11 and directly loaded into a disc playback means which is vertically movable, as can be understood later on.

The tray unlocking mechanism 50, the tray drawing mechanism 60, and the disc attracting mechanism 90 are mounted on the feed base 41, which is in the form of a rigid box made of aluminum or the like. The feed base 41 includes an upper panel 41c on which the tray stoppers 41d are disposed that project upwardly from lefthand and righthand sides at the rear end of the feed base 41. The photosensors 42 for detecting the position of a tray are fixed to the respective tray stoppers 41. The photosensors 42 detect the position of a tray by counting larger and smaller distances or gaps $S_1$, $S_2$ (see FIG. 2) of the racks 10, 11. Larger gaps $S_1$ are counted to control the disc feed unit 40 to move at a high speed, and smaller gaps $S_2$ are counted to control the disc feed unit 40 to move at small intervals under the control of the motor 21 (FIG. 5) with pulses, for accurately stopping the disc feed unit 50 in front of a desired tray 3. The count of smaller gaps $S_1$ and the count of larger gaps $S_2$ are calculated by a count control means (not shown), which will not be described in detail as it has no direct bearing on the present invention. It is assumed that the rack 10 or the rack 11 to select a disc 4 from has been determined by a suitable selector means (not shown).

The tray unlocking mechanism 50 is mounted on a front panel 41e of the feed base 41. When the feed base 41 is positioned in front of a tray 3 with a desired disc 4 placed thereon, the tray unlocking mechanism 50 starts to operate to selectively release the tray locking mechanisms 13 (FIG. 3) on the rack 10 or the tray locking mechanisms 13 on the rack 11.

Figure 7:
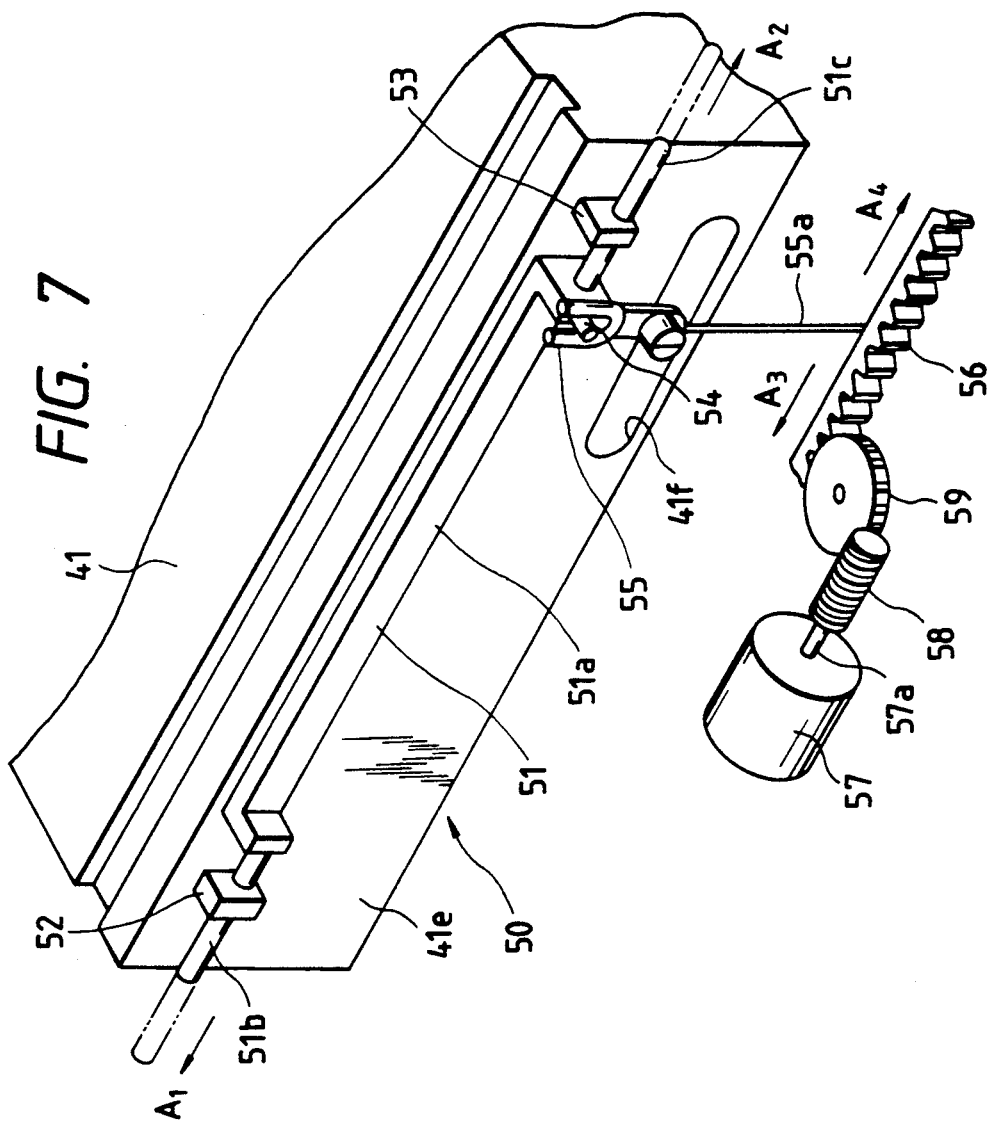
FIG. 7 is a perspective view of a tray unlocking mechanism.

As shown in detail in FIG. 7, the tray unlocking mechanism 50 includes a tray unlocking bar 51 slidably supported horizontally on the front panel 41e. The tray unlocking bar 51 includes a central elongate bent portion 51a of a channel shape as viewed in plan and a pair of round rods 51b, 51c projecting from the opposite ends of the central elongate bent portion 51a away from each other. The central elongate bent portion 51a and the round rods 51b, 51c are of an integral unitary structure. The round rods 51b, 51c are slidably supported by and extends through spaced guide blocks 52, 53 mounted on the front panel 41e. A horizontal pin 54 is fixed to one end of the central elongate bent portion 5a, and engaged by a bifurcated joint 55 having a lower end 55a that extends through a slide slot 41f defined in the front panel 41e and connected to a rack 56 disposed in the feed base 41. In the feed base 41, the rotation of a worm 58 fixed to a shaft 57a of a motor 57 is transmitted through a worm wheel 59 to the rack 56 for thereby moving the rack 56 horizontally in the directions indicated by the arrows $A_3$, $A_4$.

To release or unlock one of the tray locking mechanisms 13 (FIG. 3) on the rack 10, the rack 56 is moved in the direction $A_3$ to move the tray unlocking bar 51 in the direction indicated by the arrow $A_1$ (FIG. 7). The round rod 51b pushes the actuating arm 15b (FIG. 3), turning the lock lever 15 of the tray locking mechanism 13 in the direction B until a plurality of trays 3 that have been locked by the tray locking mechanism 13 are simultaneously unlocked from the rack 10. Anyone of the tray locking mechanisms 13 on the rack 11 can be released simply by moving the tray unlocking bar 51 in the direction indicated by the arrow $A_2$ (FIG. 7).

The tray unlocking mechanism 50 is actuated by the single motor 57 for selectively releasing or unlocking the tray locking mechanisms 13 on the racks 10, 11. Therefore, the tray unlocking mechanism 50 can be controlled with ease. Since the tray unlocking mechanism 50 is also comparatively simple in structure, it can be installed in a relatively small space, and hence the disc feed unit 40 can be small in size.

When a plurality of trays 3 are simultaneously unlocked from the rack 10 or 11, only the tray 3 with a desired disc 4 can be transferred onto the upper panel 41c of the feed base 41 through the confronting guide grooves 41g, 41h that are defined in the front and rear ends of the feed base 41, as shown in FIG. . The other trays 3 than the tray 3 with the desired disc 4 thereon are engaged at their front ends by front surfaces $41d_1$ of the tray stoppers 41d near the respective trays 10, 11, and prevented from being loaded onto the feed base 41. Only the tray 3 with the desired disc 4 thereon is inserted through the guide grooves 41g, 41h. The other trays 3 that are prevented from being loaded onto the feed base 41 remain stored in the rack 10 or 11. Therefore, the automatic disc playback system 1 according to the present invention is highly reliable in selecting desired discs 4.

The tray drawing mechanism 60 will be described below with reference to FIGS. 6 and 8.

The tray drawing mechanism 60 serves to draw a rack tray 3 out of the rack 10 or 11 onto the feed base 41, to draw a disc playback unit tray 5 from the disc playback unit 120 or 121 onto the feed base 41, and to return the tray 3 or 5 back into the storage position in the rack 10 or 11 or the disc playback unit 120 or 121. The tray drawing mechanism 60 will be described with respect to the process of drawing a rack tray 3 from the rack 10 or 11. The process of drawing a disc playback unit tray 5 from the disc playback unit 120 or 121 will not be described below as it is the same as the process of drawing a rack tray 3 from the rack 10 or 11.

As shown in FIG. 6, the tray drawing mechanism 60 is positioned in the vicinity of the tray stoppers 41d on the feed base 41. The tray drawing mechanism 60 is horizontally movable in the directions indicated by the arrows $D_1$, $D_2$ parallel to the guide grooves 41g, 41h.

Figure 8:
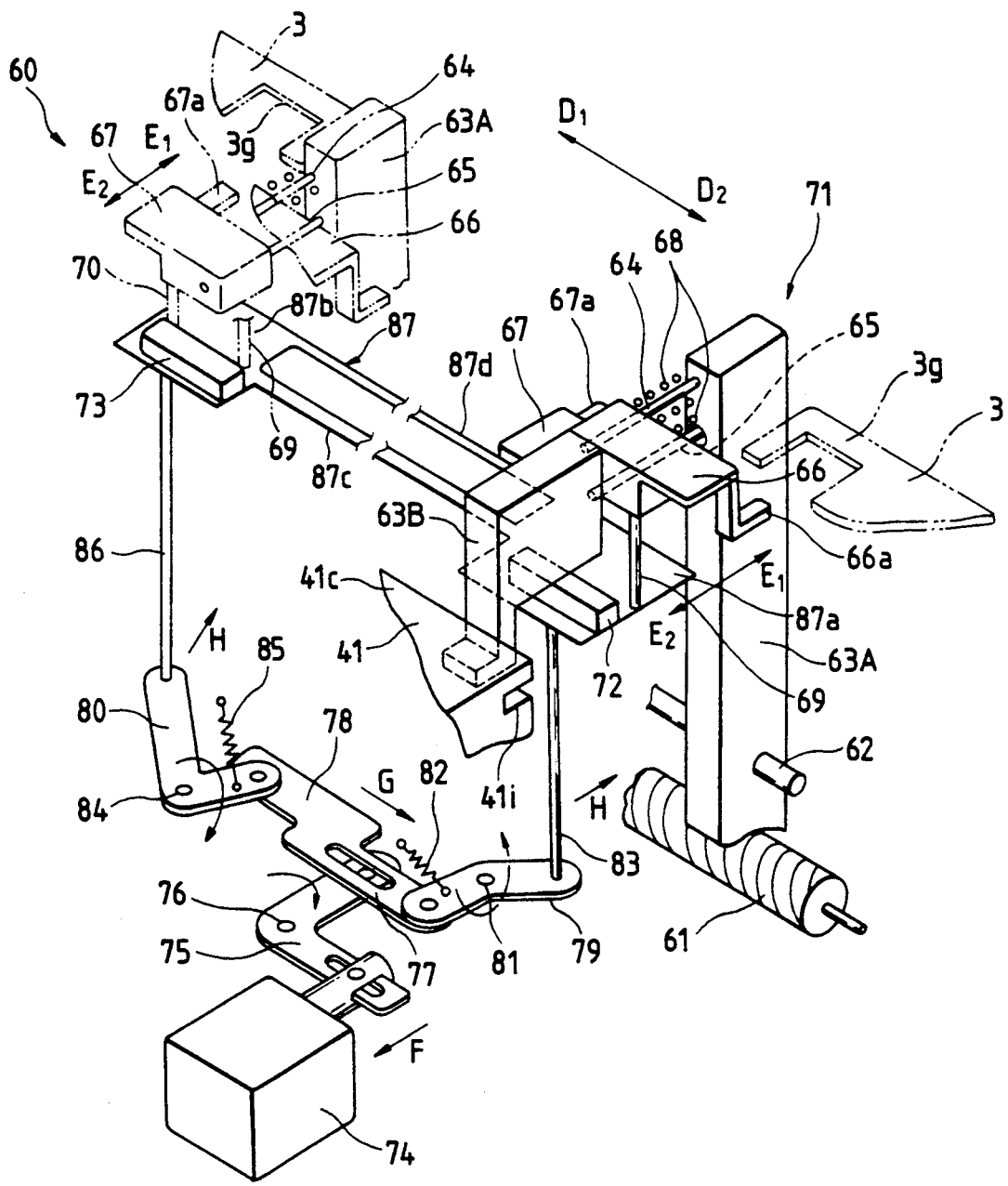
FIG. 8 is a perspective view of a tray drawing mechanism.

As shown in FIG. 8, the tray drawing mechanism 60 has a horizontal elongate screw rod 61 rotatably supported in the feed base 41, the screw rod 61 being coupled at one end thereof to a drive source (not shown) such as a motor. A vertical clamp support plate 63A has a threaded lower end held in mesh with the screw rod 61 and is movable along a guide rod 62 parallel to the screw rod 16 in the horizontal direction $D_1$ or $D_2$ when the screw rod 16 rotates about its own axis. The clamp support plate 63A has an upper portion projecting upwardly beyond the upper panel 41c of the feed base 41. Two vertically spaced horizontal shafts 64, 65 have ends fixed to the projecting upper end portion o the clamp support plate 63A. To the other ends of the shafts 64, there is coupled another vertical clamp support plate 63B horizontally spaced from and confronting the clamp support plate 63A. The clamp support plate 63B has a lower end slidably received in a guide groove 41i defined horizontally in the upper panel 41c of the feed base 41. Therefore, when the clamp support plate 63A is horizontally moved by the screw rod 61, the clamp support late 63B is also horizontally moved in unison therewith along the guide groove 41i.

Clamps 66, 67 for clamping one of the clampable members 3g of a tray 3 are fitted over the respective shafts 64, 65 and normally urged toward the clamp support member 63B under the bias of compression springs 68 disposed around the respective shafts 64, 65. As indicated by the solid lines in the righthand side of FIG. 8, the clamp 66 is fitted over the upper shaft 64 for clamping one of the trays 3 in the rack 11. As indicated by the two-dot-and-dash liens in the lefthand side of FIG. 8, the clamp 67 is fitted over the lower shaft 65 for clamping one of the trays 3 in the rack 10. As described later on, when a tray 3 is to be clamped, the clamps 66, 67 are simultaneously pushed by pushers 72, 73. In a process of clamping a tray 3, only one of the clamps 66, 67 are effective to clamp a tray 3. The clamps 66, 67 are independently movable on and along the shafts 64, 65. The clamps 66, 67 have L-shaped clamping fingers 66a, 67a, respectively, on side surfaces thereof. Shafts 69, 70 (the shaft 70 is shown by the two-dot-and-dash lines in the lefthand side of FIG. 8) are fixed to and extend vertically from the lower surfaces of the respective clamps 66, 67. The clamps 66, 67 that are supported by the clamp support plates 63A, 63B are assembled together as a clamp assembly 71.

Two pushers 72, 73 are disposed at the lateral opposite ends of the upper panel 451c of the feed base 41 near the respective ends of the stroke of the clamp assembly 71. The pushers 72, 73 serve to move, in the direction indicated by the arrow $E_1$, the clamps 66, 67 that have been displaced to one of the lateral opposite ends of the upper panel 41c. When the pushers 72, 73 push the clamps 66, 67, they are held in engagement with the shafts 69, 70 fixed the clamps 66, 67.

The pushers 72, 73 are actuated by a solenoid 74. More specifically, when the solenoid 74 is energized to pull its plungers in the direction indicated by the arrow F, a lever 75 coupled to the plunger of the solenoid 74 is turned clockwise about a shaft 76. When the lever 75 is turned clockwise, a slider 78 pivotally coupled to one end of the lever 75 by a pin 77 is horizontally moved in the direction indicated by the arrow G along a guide (not shown). The slider 78 has opposite ends pivotally coupled to ends of respective levers 79, 80. The righthand lever 79 (as viewed in FIG. 8) is normally urged to turn clockwise about a shaft 81 by a tension spring 82, and is fixed to the pusher 72 by a shaft 83 connected to the other end of the lever 79. The lefthand lever 80 (as viewed in FIG. 8) is normally urged to turn counterclockwise about a shaft 84 by a tension spring 85, and is fixed to the pusher 73 by a shaft 86 connected to the other end of the lever 80. Therefore, when the slider 78 is moved in the direction G, the lever 79 is angularly moved counterclockwise about the shaft 81, thereby displacing the shaft 83 fixed to the lever 79 and the pusher 72 coupled to the shaft 83 in the direction indicated by the arrow H. At the same time, the lever 80 is angularly moved clockwise about the shaft 84, thereby displacing the shaft 86 fixed to the lever 80 and the pusher 73 coupled to the shaft 86 in the direction indicated by the arrow H. When the clamp assembly 71 has been displaced to the righthand end of the upper panel 71c of the feed base 41, the pusher 72 pushes the shafts 69, 70 fixed to the clamps 66, 67 against the bias of the compression spring 68 for thereby moving the clamps 66, 67 in the direction $E_1$. Conversely, when the clamp assembly 71 has been displaced to the lefthand end of the upper panel 71c of the feed base 41, the pusher 73 pushes the shafts 69, 70 fixed to the clamps 66, 67 against the bias of th compression spring 68 for thereby moving the clamps 66, 67 in the direction $E_1$. When the solenoid 74 is de-energized, its plunger is pushed out, and the pushers 72, 73 return to their original positions under the resiliency of the springs 82, 85.

The shafts 69, 70 fixed to the respective clamps 66, 67 are movable along a guide groove assembly 87 defined in the upper panel 41c of the feed base 41. The guide groove assembly 87 is composed of two wider guide grooves 87a, 87b at opposite ends thereof and two narrower guide grooves 87c, 87d interconnecting the wider guide grooves 87a, 87b. The wider guide grooves 87a, 87b are partly defined by outer walls that project as trapezoidal walls from lateral opposite side walls of the feed base 41 as shown in FIG. 6.

As shown in FIG. 8, the shafts 69, 70 and the pushers 72, 73 are movable in the directions indicated by the arrows $E_1$, $E_2$ within the wider guide grooves 87a, 87b. The front narrower guide groove 87c guides therein the shafts 69, 70 fixed to the clamps 66, 67 when the clamp assembly 71 moves with no tray 3 clamped thereby. The rear narrower guide groove 87d guides therein the shafts 69, 70 fixed to the clamps 66, 67 when the clamp assembly 71 moves with a tray 3 clamped thereby.

Operation of the tray drawing mechanism 60 for drawing a rack 3 from the rack 3 onto the feed base 41 will be described below with reference to FIGS. 9A through 9D.

Figure 9A:
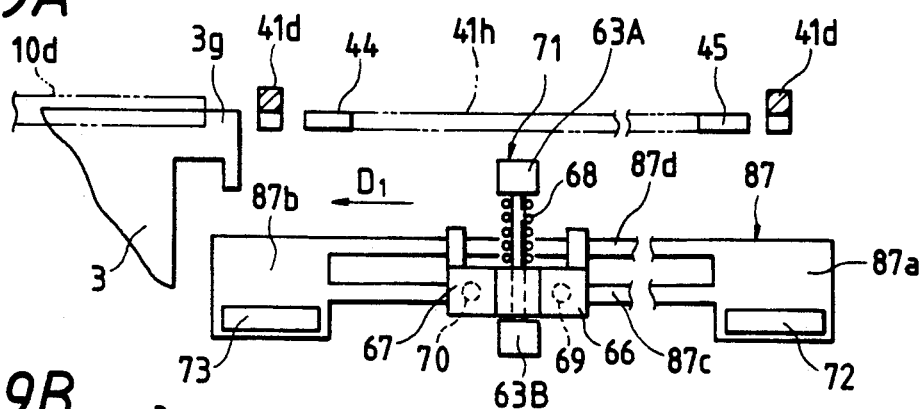
FIGS. 9A through 9D are plan views illustrative of the manner in which the tray drawing mechanism operates.

As shown in FIG. 9A, the clamp assembly 71 is positioned in the front guide groove 87c of the guide groove assembly 87. In this position, the clamps 66, 67 are urged forwardly by the compression spring 68, and the shafts 69, 70 fixed to the clamps 66, 67 are guided in the guide groove 87c.

Figure 9B:
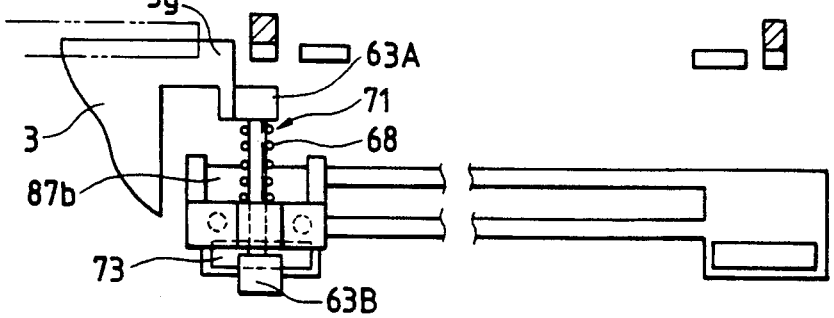

The clamp assembly 71 is moved from the position shown in FIG. 9A to the left until it is positioned in the wider guide groove 87b and a side of the clamp support plate 63A abuts against the distal end surface of one of the clampable members 3g, as shown in FIG. 9B. At this time, the desired tray 3 stored in the rack 10 and the clamp assembly 71 on the feed base 41 are securely positioned relatively to each other. The clamps 66, 67 remain urged forwardly by the compression spring 68.

Figure 9C:
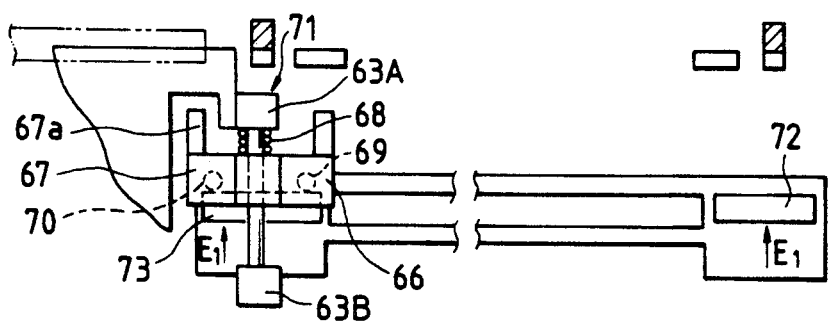

Then, as shown in FIG. 9C, the pusher 73 pushes the shafts 69, 70 in the direction $E_1$ within the wider guide groove 87b against the bias of the compression spring 68. The clamping finger 67a of the clamp 67 now enters the hook-shaped clampable member 3g of the desired tray 3. Thereafter, with the shafts 69, 70 being pushed by the pusher 73, the clamp assembly 71 is moved to the right. The clamping finger 67a of the clamp 67 pulls the clampable member 3g of the tray 3, and the shafts 69, 70 fixed to the clamps 66, 67 start to enter the rear guide groove 87d. When the shafts 69, 70 completely enter the rear guide groove 87d, the clamps 66, 67 are prevented from moving forwardly, and hence the tray 3 remains clamped by the clamp 67. The clamp 66 does not clamp the tray 3 at this time, but will operate to clamp a desired tray 3 stored in the rack 11.

Figure 9D:
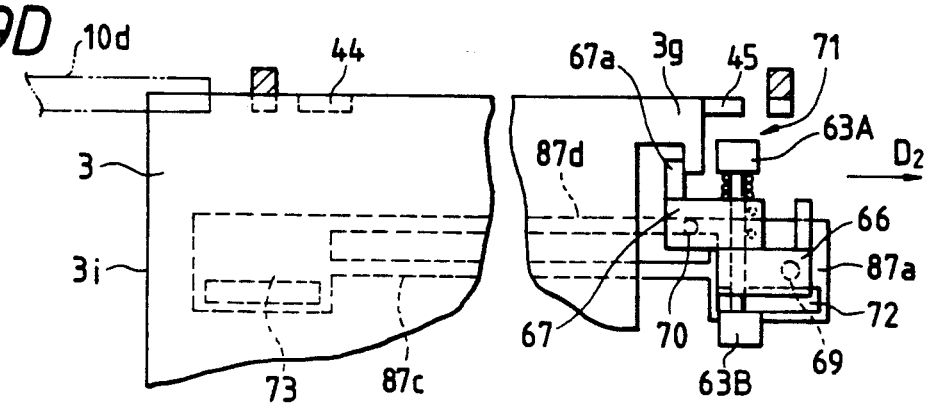

As shown in FIG. 9D, the clamp assembly 71 is further moved to the right, and then stopped immediately before it fully enters the wider guide groove 87a. More specifically, two stops 44, 45 are disposed respectively in the opposite ends of the guide groove 41h, the stops 44, 45 are angularly movable by the tray 3 as it is moved by the clamp assembly 71. At this time, the tray 3 pulled by the clamp assembly 71 pushes down and moves past the stop 44, and is stopped by the stop 45. When the distal end surface of the clampable member 3g of the tray 3 abuts against the stop 45, the shaft 70 fixed to the clamp 67 is still positioned in the guide groove 87d, with the clamping finger 67a clamping the tray 3. This condition is then followed by a disc attracting process (described later on). In the position shown in FIG. 9D, since the clamps 66, 67 are movable independently of each other, the shaft 69 fixed to the clamp 66 is displaced forwardly as it is positioned in the wider guide groove 87a. To return the drawn tray 3 back into its storage position in the rack 10 after the disc attracting process, the above process of drawing the tray 3 is reversed, i.e., the clamp assembly 71 is moved to the left. When the clamp 71 is moved to the left, the shaft 70 is guided by the rear guide groove 87d and the shaft 69 is guided by the front guide groove 87c. As shown in FIG. 9D, a rear end 3i of the tray 3 as it is drawn from the rack 10 is not fully pulled out of, but remains positioned in the groove 10d in the rack 10. Consequently, the tray 3 can easily be returned to the storage position in the rack 10 because it is guided by the groove 10d.

The tray drawing mechanism 60 employs a single drive source or actuator for selectively drawing or returning one of the trays 3, 5. Therefore, it is easy to control the tray drawing mechanism 60 when it operates. Since the tray drawing mechanism 60 is relatively simple in structure, it is relatively small and can be positioned in a relatively small space, with the result that the disc feed unit 40 may be small in size.

The disc attracting mechanism 90 which attracts a disc 4 placed on a rack tray 3 or a disc 4 placed on a disc playback unit tray 5 will be described below with reference to FIG. 10.

Figure 10:
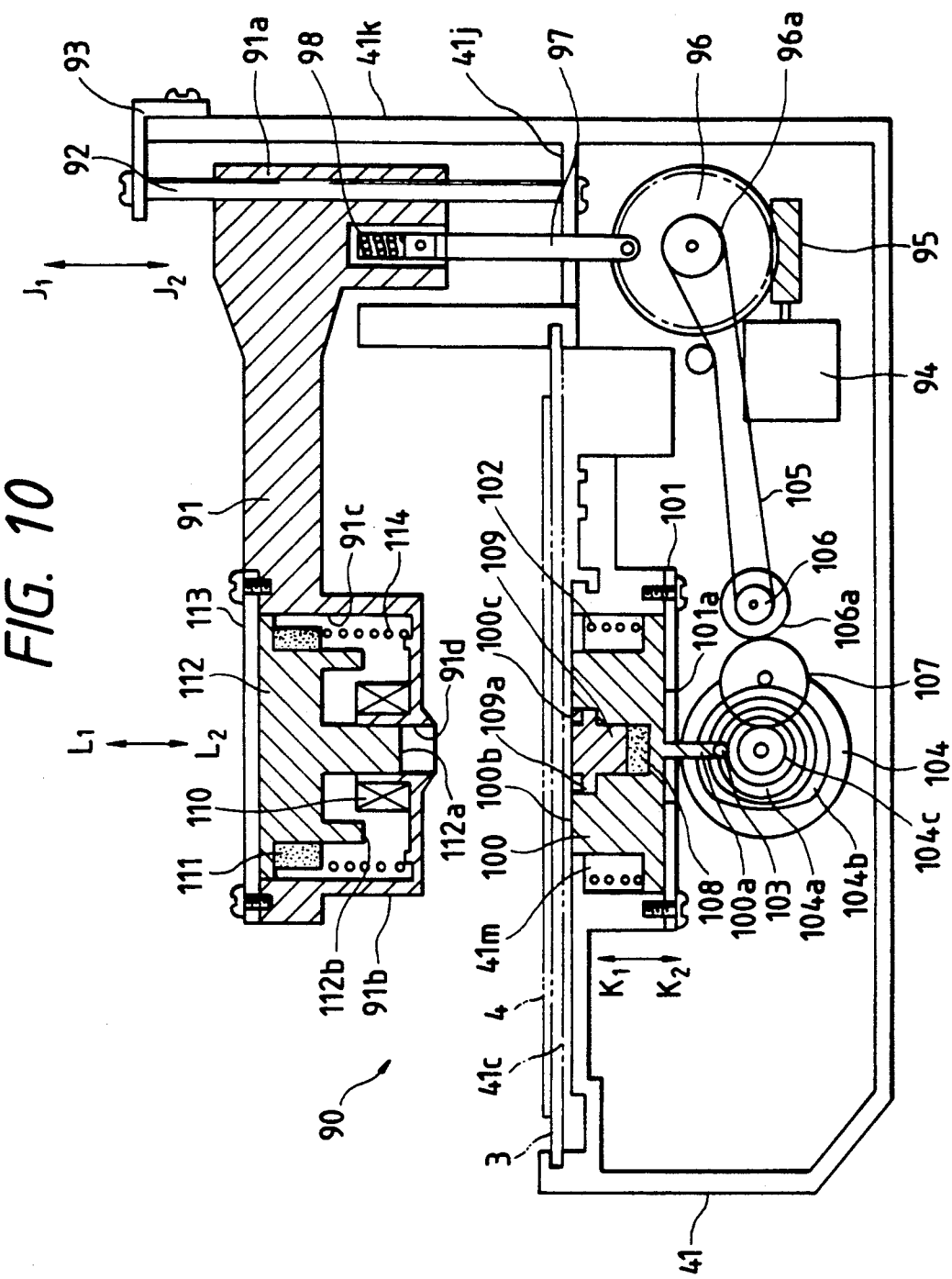
FIG. 10 is a cross-sectional view of a disc attracting mechanism.

In FIG. 10, the disc attracting mechanism 90 includes an arm 91 disposed above the upper panel 41c of the feed base 41 and movably supported by a vertical shaft 92 mounted on the feed base 41. The arm 91 is vertically movable in the directions indicated by the arrows $J_1$, $J_2$. The arm 91 has a vertical hole 91a defined in a rear end thereof and through which the shaft 92 extends. The shaft 92 has a lower end mounted on a rear horizontal panel 41j of the feed base 41 and an upper end supported by an L-shaped bracket 93 fastened to the upper end of a rear panel 41k of the feed base 41. The arm 91 is vertically moved by a motor 94 disposed within the feed base 41. The motor 94 has a motor shaft connected to a worm 95 meshing with a worm wheel 96 to which the lower end of a connecting rod 97 is connected. The upper end of the connecting rod 97 is connected to the arm 91 through a compression spring 98. The compression spring 98 serves to dampen slight displacements of the connecting rod 97 thereby keeping the arm 91 immovable in a small range of distances when a tray table 100 (described below) is slightly moved vertically by the motor 94.

The upper panel 41c of the feed base 41 has a stepped through hole 41m defined substantially centrally therein. The tray table 100 is disposed in the stepped through hole 41m for slight vertical movement in the directions indicated by the arrows $K_1$, $K_2$. A cover 101 with a central hole 101a is fixed to the lower end of a tubular member that defines the stepped through hole 41m, thus closing the stepped through hole 41m.

The tray table 100 is in the form of a stepped cylinder that is fitted within the stepped through hole 41m, the tray table 100 being normally urged to move downwardly by a compression spring 102. The tray table 100 has a downwardly extending finger 100a on a central lower surface thereof, with a pin 103 fixed to the lower end of the downwardly extending finger 100a. The pin 103 is held in sliding contact with a cam wheel 104. The cam wheel 104 has a substantially spiral cam composed of a smaller-diameter cam surface 104a and a larger-diameter cam surface 104b which are spirally continuously formed. When the pin 103 is in sliding contact with the smaller-diameter cam surface 104a, the tray table 100 has its upper surface lying flush with the upper surface of the upper panel 41c of the feed base 41. When the pin 103 is in sliding contact with the larger-diameter cam surface 104b, the upper surface 100b of the tray table 100 slightly projects upwardly beyond the upper surface of the upper panel 41c.

The cam wheel 104 is also actuated by the motor 94 that actuates the arm 91. The rotation of the wheel wheel 96 rotated by the motor 94 is transmitted from a timing pulley 96a coaxially fixed to the worm wheel 96 through a timing belt 105 to a timing pulley 106, from which the rotation is transmitted through a gear 106a coaxially fixed to the timing pulley 106 and an idle gear 107 to a gear 104c of the cam wheel 104, thus rotating the cam wheel 104.

The tray table 100 has a stepped blind hole 100c defined centrally in its upper surface 100b. A permanent magnet (second permanent magnet) 108 which produces weak magnetic forces downwardly is fixedly mounted on the bottom of the stepped blind hole 100c. The hole 100c also houses a disc catcher (first iron member) 109 of soft magnetic iron removably disposed upwardly of the permanent magnet 108. The disc catcher 109 has a distal end shaped such that it can be fitted in the central hole 4a of a disc 4 and also a guide hole 91d (described below). The disc catcher 109 has an intermediate flange 109a that can be held against the lower surface of the disc 4 around the central hole 4a thereof.

The arm 91 has a cylindrical projection 91b extending downwardly from a distal end thereof in confronting relationship to the upper surface 100b of the tray table 100. The projection 91b has an upwardly opening hole 91c defined therein, and a guide hole 91d defined centrally through the bottom of the hole 91c concentrically with the hole 91c. The guide hole 91d is defined by a tubular member which projects centrally upwardly into the hole 91c.

An electromagnet 110 is fixedly fitted over the tubular member of the guide hole 91d. The electromagnet 110 is of a known structure having a coil which when energized, produces magnetic forces whose direction varies depending on the direction in which the current flows through the coil.

A soft magnetic iron core (second iron member) with a permanent magnet (first permanent magnet) 111 fixedly fitted thereover is movably disposed above the electromagnet 110 in the hole 91c for vertical movement in the directions indicated by the arrows $L_1$, $L_2$. Upward magnetic forces are always produced by the permanent magnet 111 to act on the soft magnetic iron core 112. The upper end of the hole 91c is closed by a cover 113 fastened to the arm 91. The soft magnetic iron core 112 is normally urged to move upwardly under the bias of a compression spring 111 disposed in the hole 91c.

The soft magnetic iron core 112 has a central attracting member 112a projecting downwardly from a central portion thereof and an annular magnetic path member 112b projecting downwardly from an outer circumferential portion thereof. The attracting member 112a is downwardly fitted in the guide hole 91d. In the disc attracting process (described later on), the upper distal end of the disc catcher 109 can be upwardly fitted into the guide hole 91d, and magnetically attracted to the attracting member 112a of the soft magnetic iron core 112.

Operation of the disc attracting mechanism 90 for attracting a disc 4 placed on a tray 3 will be described below with reference to FIGS. 10, 11A~11C, and 12A~12D.

As indicated by the two-dot-and-dash lines in FIG. 10, it is assumed that the disc 4 placed on the tray 3 is drawn from the rack 10 or 11 onto the upper panel 41c of the feed base 41 by the tray drawing mechanism 60 (see FIG. 6).

Figure 12A:
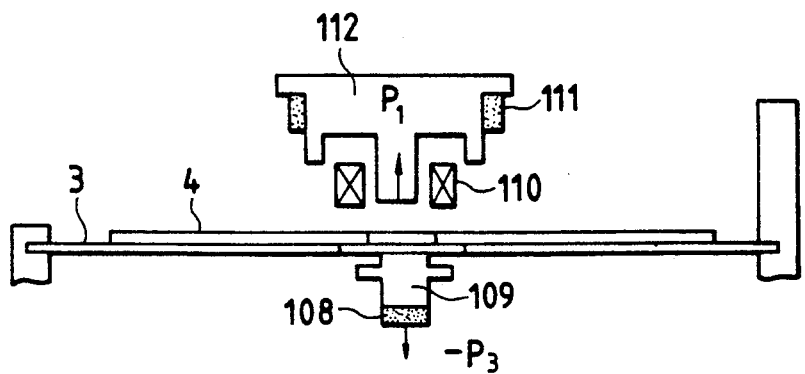
FIGS. 12A through 12D are views showing the relationship between attractive forces produced by the disc attracting mechanism.
Figure 12B:
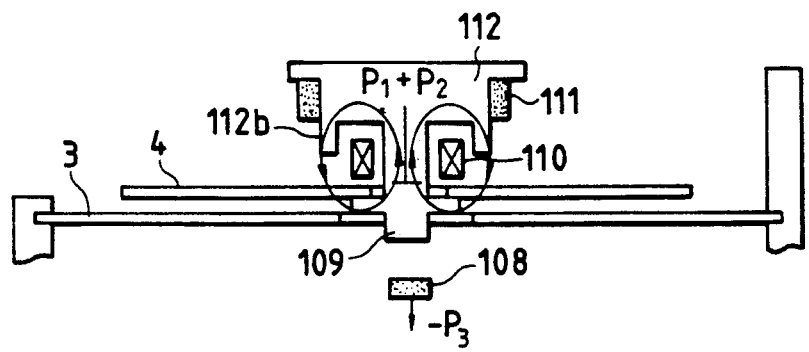

The arm 91 is lowered from the position shown in FIG. 10 until the projection 91b thereof is held against the upper surface of the disc 4. Upon downward movement of the arm 91, the pin 103 fixed to the downward finger 100a of the tray table 100 slidingly contacts the larger-diameter cam surface 104b of the cam wheel 104, and the upper surface 100b of the tray table 100 projects upwardly into abutment with the lower surface of the tray 3. The guide hole 91d of the arm 91 and the central hole 4a of the disc are held in vertically confronting relationship to each other, and the guide hole 91d also confronts the disc catcher 109. As shown in FIG. 12A, a magnetic force $P_1$ produced by the permanent magnet 111 acts upwardly on the soft magnetic iron core 112, and a magnetic force $-P_3$ produced by the permanent magnet 108 acts downwardly on the disc catcher 109. Therefore, the soft magnetic iron core 112 and the disc catcher 109 are magnetically repelled from each other, and the soft magnetic iron core 112 and the disc catcher 109 are spaced from each other. Thus, the magnetic force $P_1$ acting on the soft magnetic iron core 112 is not intensive enough to move the disc catcher 109 upwardly, which remains attracted to the permanent magnet 109.

Figure 11A:
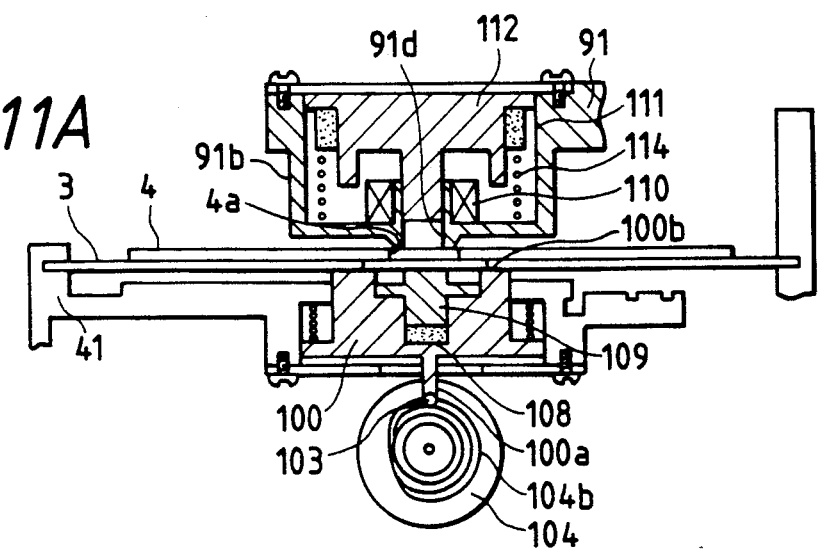
FIGS. 11A through 11C are cross-sectional views illustrative of the manner in which the disc attracting mechanism operates.
Figure 11B:
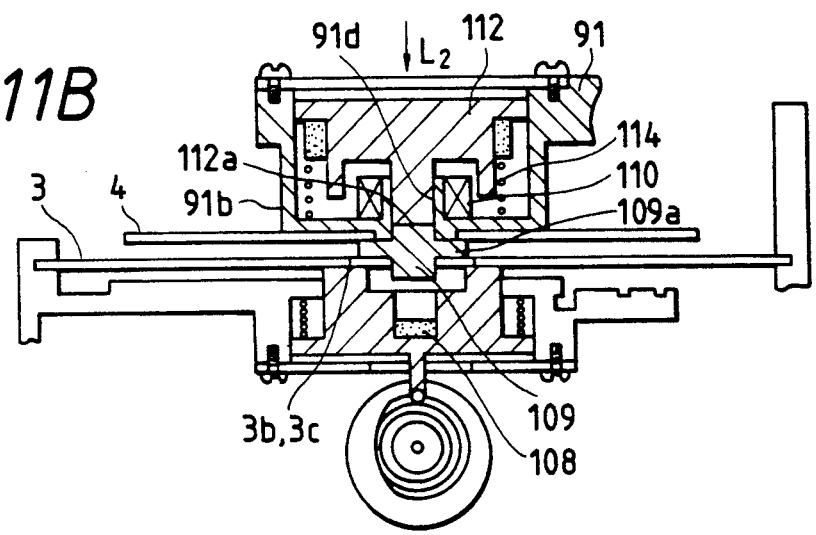

The electromagnet 110 is now energized to move the components from the position shown in FIG. 11A to the position shown in FIG. 11B. More specifically, as shown in FIG. 12A, the current supplied to the electromagnet 110 is controlled so that it produces an upward magnetic force. The electromagnet 110 generates an upward magnetic force $P_2$ along a magnetic path that is generated through the magnetic path member 112b as indicated by the arrows in FIG. 12B. The sum of magnetic forces $P_1$, $P_2$ now acts on the soft magnetic iron core 112. The soft magnetic iron core 112 is magnetically attracted to the electromagnet 110, moving downwardly in the direction $L_2$ against the bias of the compression spring 114, as shown in FIG. 11B. The spacing between the soft magnetic iron core 112 and the disc catcher 109 is reduced, and the sum of magnetic forces $P_1$, $P_2$ acting on the soft magnetic iron core 112 becomes stronger in the upward direction than the magnetic force $P_3$ acting on the disc catcher 109. Under the differential magnetic force, the distal end of the disc catcher 109 positioned beneath the lower surface of the tray 3 is displaced upwardly through the holes 3b, 3c of the tray 3 into the central hole 4a of the disc 4 and also into the guide hole 91d of the arm 31, and is magnetically attracted to the attracting member 112a of the soft magnetic iron core 112. As the disc catcher 109 is thus magnetically attracted to the soft magnetic iron core 112, the flange 109a of the disc catcher 109 is held against the lower surface of the disc 4, lifting the disc 4 off the tray 3. The disc 4 is securely gripped between the projection 91b of the arm 91 and the flange 109a of the disc catcher 109. The disc 4 is therefore shifted from the tray 3 to the arm 91 and retained by the arm 91.

Figure 11C:
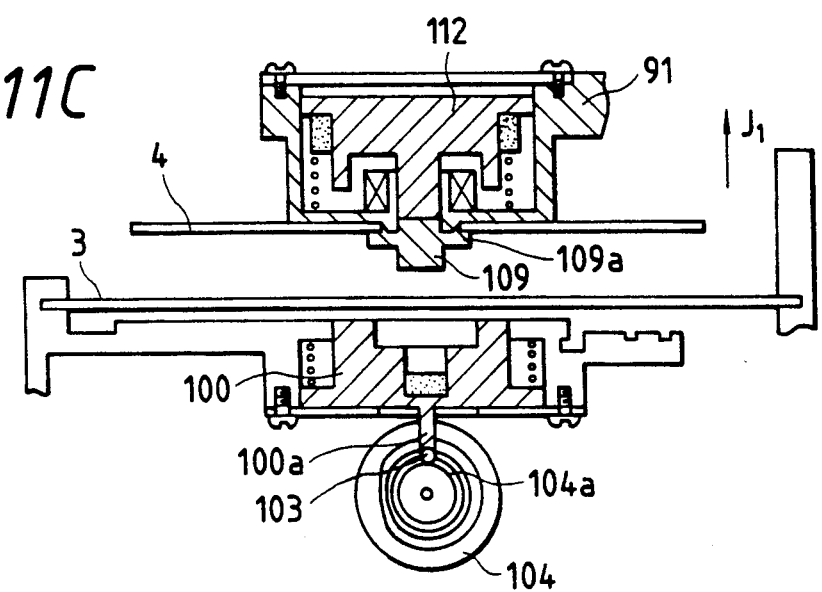
Figure 12C:
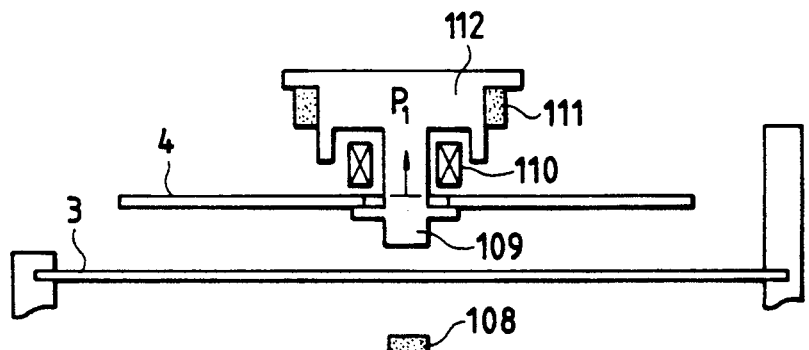

When the disc 4 is retained by the arm 91, the arm 91 is moved upwardly in the direction $J_1$, as shown in FIG. 11C. Upon upward movement of the arm 91, the pin 103 fixed to the finger 100a is displaced into sliding contact with the smaller-diameter cam surface 104a, and the tray table 100 moves downwardly. At this time, the electromagnet 110 is de-energized as shown in FIG. 12C. The disc catcher 109 still holds the disc 4 because it remains magnetically attracted to the soft magnetic iron core 112 under the magnetic force $P_1$ produced by the permanent magnet 111. The electromagnet 110 is de-energized for the reason that the disc 4 can reliably be retained by the arm 91 even upon a power failure and the electric consumption by the automatic disc playback system 1 is reduced. The electromagnet 110 may remain energized when the arm 91 is moved upwardly.

In the illustrated embodiment, the electromagnet 110 and the permanent magnet 111 are combined into a self-holding magnetic structure. However, the permanent magnet 111 may be dispensed with, and the electromagnet 110 may simply be turned on and off. In such a modification, the electromagnet 110 must be energized at all times in order to retain the disc 4 on the arm 91.

Therefore, the disc 4 is reliably retained by the arm 91 and can be fed by itself without having to be placed on and hence accompanied by the tray 3.

Figure 12D:
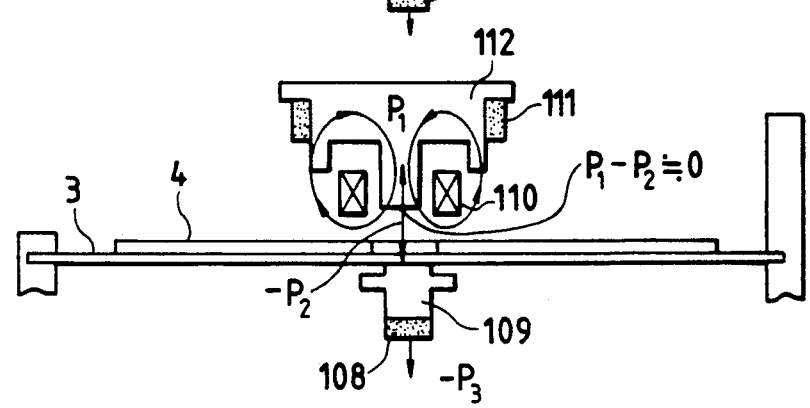

To return the disc 4 retained by the arm 91 back to the tray 3, the electromagnet 110 is energized with a reverse current to produce a magnetic force $-P_2$ along a magnetic path generated through the magnetic path member 112b as indicated by the arrows in FIG. 12D. Now, a magnetic force $P_1-P_2$ acts on the soft magnetic iron core 112. The permanent magnet 111 and the electromagnet 110 are designed beforehand such that the magnetic force $P_1-P_2$ is substantially zero. Therefore, the disc catcher 109 falls off the soft magnetic iron core 112 back onto the tray table 100 in the feed base 41, and is magnetically attracted again to the permanent magnet 108. At this time, the magnetic force $-P_3$ produced by the permanent magnet 108 assists the disc catcher 109 in immediately dropping into the feed base 41. However, the disc catcher 109 may fall by gravity only without the magnetic force from the permanent magnet 108. As the disc catcher 109 returns into the feed base 41, the disc 4 supported on the flange 109a of the disc catcher 109 is placed on the tray 3 again. Disc playback unit 120, 121 and Disc playback unit tray 5:

The disc playback units 120, 121 and the disc playback unit tray 5 will be described below with reference to FIGS. 13, 14, and 15A and 15B.

The disc playback units 120, 121 are symmetrically positioned in the lowermost locations in the housing 2 shown in FIG. 1. These disc playback units 120, 121 are identical in structure, and only the disc playback unit 120 will be described below.

Figure 13:
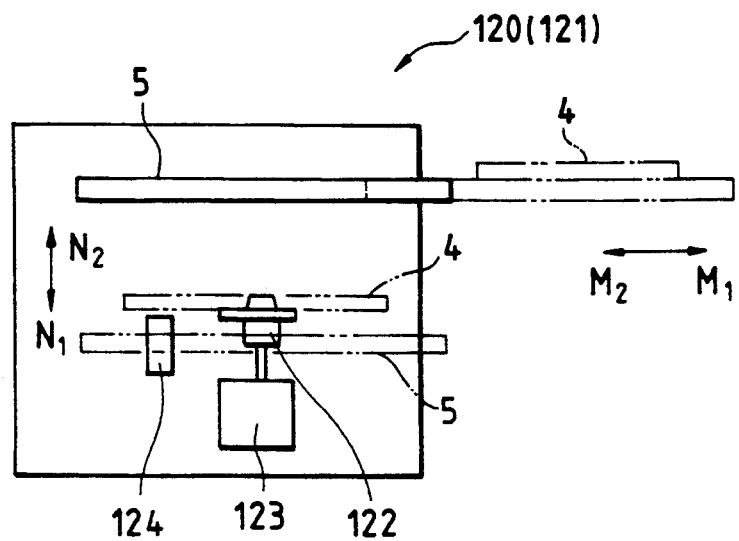
FIG. 13 is a schematic view of a disc playback unit.

As shown in FIG. 13, the disc playback unit 120 comprises a turntable 122, a turntable motor 123 having a motor shaft coaxially fixed to the turntable 122, and an optical pickup 124 for reproducing, or recording and reproducing, signals on a disc 4 in the disc playback unit 120. The disc playback unit 120 is of a known arrangement, and will not be described in detail below.

The disc playback unit tray 5 is movably disposed above the turntable 122 for horizontal movement in the directions indicated by the arrows $M_1$, $M_2$. In the disc playback unit 120, the tray 5 is also vertically movable in the directions indicated by the arrows N1, N2. When a disc 4 is placed on the tray 5 in a process described later on, the tray 5 is moved downwardly in the direction $N_1$ to place the disc 4 carried thereby on the turntable 122. Thereafter, the turntable 122 is rotated by the turntable motor 123, and the disc 4 on the turntable 122 is played back by the optical pickup 124. While the disc 4 is being played, only signals recorded on the disc 4 may be reproduced, or signals may be recorded on and reproduced from the disc 4, depending on the type of the disc 4 used. The disc 4 is capable of outputting audio information, video information, character information, or the like, as described above.

Figure 14:
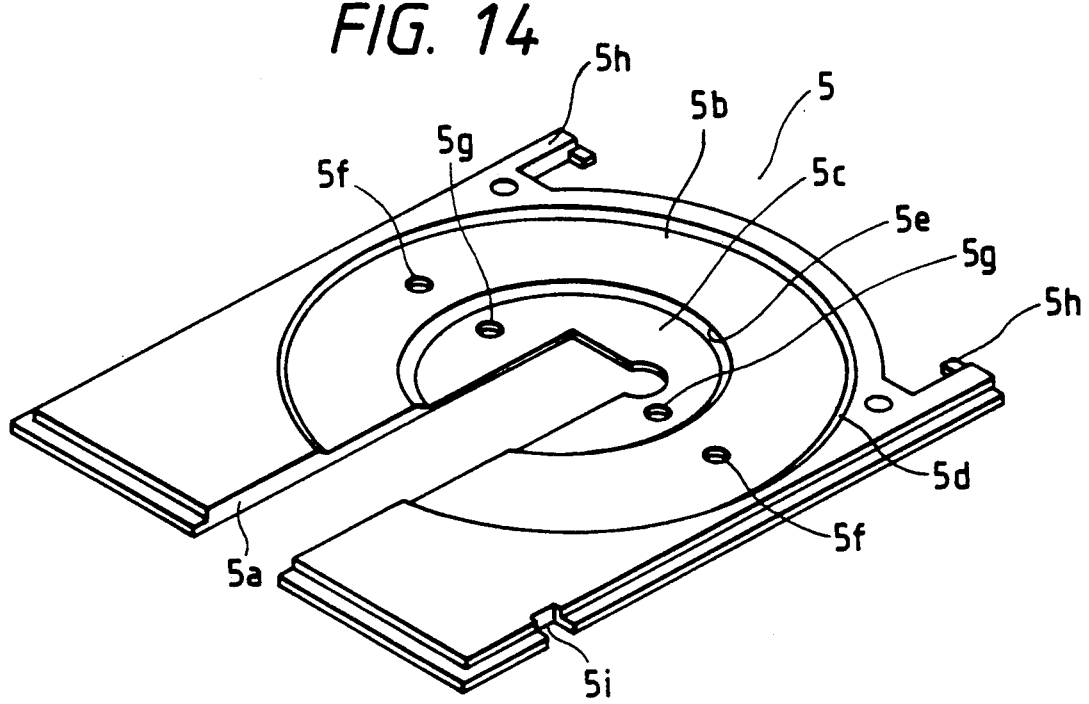
FIG. 14 is a perspective view of a tray for the disc playback unit.

The disc playback unit tray 5 shown in FIG. 14 is different in shape from the rack tray 3 (see FIG. 4) in that the tray 5 is arranged to allow the optical pickup 124 to move with respect to the tray 5. However, the disc playback unit tray 5 can be drawn from the disc playback unit 5 and returned back to the disc playback unit 5 by the same disc drawing mechanism 60 as described above.

As shown in FIG. 14, the disc playback unit tray 5 has an elongate opening 5a defined centrally in the longitudinal direction thereof for allowing the optical pickup 124 to move therein. The disc playback unit tray 5 also has two circular disc support surfaces 5b, 5c defined at different levels and having different diameters for receiving thereon discs of different diameters. The circular disc support surfaces 5b, 5c are bounded by circular steps 5d, 5e, respectively, that are used to hold outer circumferential edges of discs of different, i.e., larger and smaller diameters, respectively. The disc support surface 5c is smaller in diameter and lower in height than the disc support surface 5b. Therefore, the disc support surfaces 5b, 5c are of a two-stepped recess configuration. The disc support surface 5b can support a CD having a larger outside diameter of 12 cm, for example, and the disc support surface 5c can support a CD having a smaller outside diameter of 8 cm, for example. The tray 5 also has two pairs of diametrically opposite detecting holes 5f, 5g defined therein for detecting the outside diameter of a disc placed thereon. The detecting holes 5f are used to detect a disc 4A of a larger outside diameter, and the detecting holes 5g are used to detect a disc 4B of a smaller outside diameter. The detecting holes 5f, 5g cooperate with the photosensors (not shown) in the feed base in detecting the outside diameter of a disc placed on the tray 5.

The tray 5 also has a pair of hook-shaped clampable members 5h on its front end at opposite sides thereof for drawing the tray 5 from the disc playback unit 120 or 121 and returning the tray 5 back into the disc playback unit 120 or 121. These clampable members 5h are identical in shape to the clampable members 3g (see FIG. 4) of the tray 3, and can be clamped by the tray drawing mechanism 60 (see FIG. 8). Therefore, the clampable members 5h will not be described in detail below.

The tray 5 also has a pair of recesses 5i (only one shown in FIG. 14) defined in opposite sides thereof for detecting the tray 5 as a disc playback unit disc. When the tray 5 is drawn from the disc playback unit 120 or 121 onto the field unit 41, a lever 46 (see FIG. 6) disposed near a front panel 41e of the feed unit 41 enters one of the recesses 58 of the tray 5, turning on a microswitch 47 indicating that the tray drawn onto the feed unit 41 is a disc playback unit tray 5. When a tray 3 is drawn onto the feed unit 41, since no such recess is defined in opposite sides thereof, the microswitch 47 remains turned off.

Figure 15A:
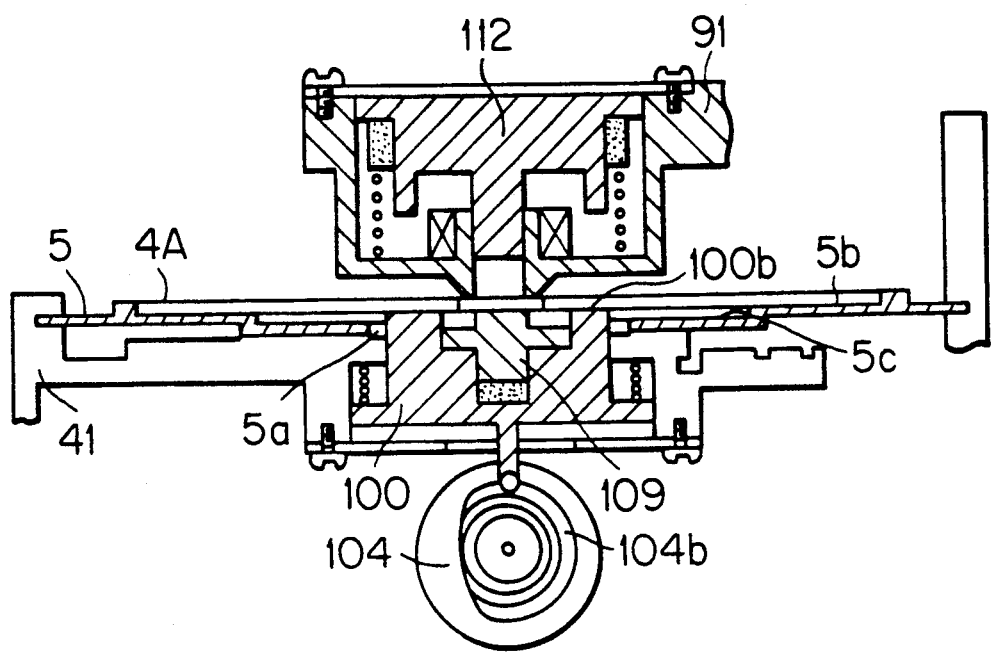
FIGS. 15A and 15B are cross-sectional views showing the manner in which the tray for the disc playback unit is drawn onto the disc feed unit and discs of different outside diameters are placed on the tray.
Figure 15B:
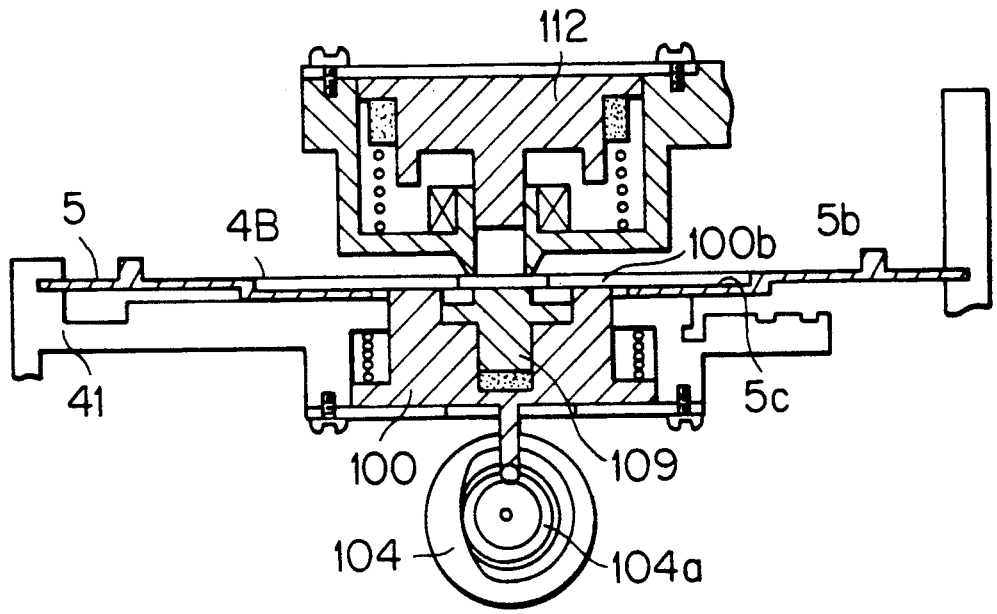

When the tray 5 is drawn onto the feed unit 41, the disc attracting mechanism 90 is actuated as described later on. As shown in FIGS. 15A and 15B, the tray table 100 is brought into different vertical positions depending on the outside diameter of a disc carried by the disc feed unit 40. More specifically, when the disc 4 is to be retained by the arm 91, the tray table 100 is vertically moved a distance depending on the diameter of the disc 4 to minimize the distance between the soft magnetic iron core 112 and the disc catcher 109 because the disc support surface 5c for placing a smaller-diameter disc 4B thereon is lower than the disc support surface 5b for placing a larger-diameter disc 4A. Therefore, when the larger-diameter disc 4A is to be retained by the arm 91, the tray table 100 is displaced upwardly into an upper position in abutment against the lower surface of the disc 4A, as shown in FIG. 15A. When the smaller-diameter disc 4B is to be retained by the arm 91, the tray table 100 is not displaced upwardly, but remains in a lower position in abutment against the lower surface of the disc 4B, as shown in FIG. 15B. The height of the tray table 100 is controlled by the cam wheel 104 which has the smaller-diameter cam surface 104a and the larger-diameter cam surface 104b which selectively engage the pin 103.

Operation of automatic disc playback system 1:

Operation of the automatic disc playback system 1 will be described below with reference to FIGS. 16A~16G and 17A~17H. The operation of the automatic disc playback system 1 is carried out in steps 1 through 7 shown in FIGS. 16A~16G, respectively, and steps 8 through 15 shown in FIGS. 16A~16H, respectively.

[STEP 1]

The rack 10 or 11 stores trays 3 with respective discs 4 placed thereon, and the disc feed unit 40 is positioned in front of a tray 3 with a desired disc 4 placed thereon. The tray locking mechanism 13 corresponding to the desired disc 4 on the rack 10 or 11 is released by the tray unlocking mechanism 50 on the disc feed unit 50. At this time, the tray drawing mechanism 60 on the disc feed unit 40 is in the position shown in FIG. 9A, with the arm 91 in the upper position and the disc catcher 109 in the feed base 41.

[STEP 2]

The tray drawing mechanism 60 is moved to the left and clamps the distal end of the tray 3.

[STEP 3]

The tray drawing mechanism 60 is moved to the right, drawing the tray 3 with the disc 4 thereon onto the feed base 41.

[STEP 4]

The arm 91 is lowered until the distal end thereof abuts against the upper surface of the disc 4, and the disc attracting mechanism 90 is actuated to cause the disc catcher 109 to raise and retain the disc 4 against the arm 91.

[STEP 5]

The arm 91 with the disc 4 retained is moved upwardly.

[STEP 6]

The tray drawing mechanism 60 is moved to the left, returning only the tray 3 back into the rack 10 or 11.

[STEP 7]

The disc feed unit 40 with only the disc 4 held thereon is moved to the disc playback unit 120 or 121 that is positioned in the lower position in the housing 2.

[STEP 8]

The disc feed unit 40 is positioned in front of the disc playback unit 120 or 121.

[STEP 9]

The tray drawing mechanism 60 clamps the distal end of the disc playback unit tray 5.

[STEP 10]

The tray 5 is drawing onto the feed base 41.

[STEP 11]

The arm 91 which supports the disc 4 is lowered, and the disc catcher 109 is dropped form the arm 91, placing the disc 4 on the tray 5.

[STEP 12]

The arm 91 is moved upwardly.

[STEP 13]

The tray drawing mechanism 60 is moved to the left, inserting the disc 4 on the tray 5 into the disc playback unit 120 or 121.

[STEP 14]

The tray drawing mechanism 60 is returned to the feed base 41.

[STEP 15]

In the disc playback unit 120 or 121, the tray 5 is moved downwardly into a position below the turntable 122, placing the disc 4 on the turntable 122, and then the disc 4 is played back.

The disc 4 can be returned to its storage location in the rack 10 or 11 in a process which is a reversal of the above process.

Although a certain preferred embodiment of the present invention has been shown and described in detail, it should be understood that various changes and modifications may be made therein without departing from the scope of the appended claims.

What is claimed is:

1. An automatic disc playback system comprising:
   a rack housing a plurality of trays with respective discs placed thereon, each of said trays having a central hole and each of said discs having a central hole aligned with the central hole of the tray;

a disc playback unit for playing back any one, at a time, of the discs; and a disc feed unit movable along said rack for feeding any one, at a time, of the discs from said rack to said disc playback unit;

said disc feed unit comprising:

disc drawing means for drawing a tray with a disc placed thereon from said rack, holding the disc, returning the tray into said rack before the disc is fed from said rack to said disc playback unit by said disc feed unit;

disc attracting means including a first iron member movable upwardly through the central hole of the tray into engagement with the disc around the central hole thereof; and electromagnetic attracting means movable downwardly for magnetically attracting said first iron member together with the disc engaged thereby.

2. An automatic disc playback system according to claim 1, wherein said electromagnetic attracting means comprises:

a second iron member; and an electromagnet disposed around said second iron member;

said electromagnet being energizable to cause said second iron member to magnetically attract said first iron member together with the disc engaged thereby.

3. An automatic disc playback system according to claim 1, wherein said electromagnetic attracting means comprises:

a second iron member;

a first permanent magnet for producing an upward magnetic force, said first permanent magnet being fixedly mounted on said second iron member;

an electromagnet disposed around said second iron member;

said electromagnet being energizable with a current flowing in one direction for producing an upward magnetic force, which is added to the upward magnetic force produced by said first permanent magnet to cause said second iron member to magnetically attract said first iron member together with the disc engaged thereby, and being energizable with a current flowing in an opposite direction for producing a downward magnetic force, which is subtracted from the upward magnetic force produced by said first permanent magnet to magnetically release said firs iron member from said second iron member;

said upward magnetic force produced by said first permanent magnet being strong enough to hold said first iron member against said second iron member when said electromagnet is de-energized.

4. An automatic disc playback system according to claim 3, further including a second permanent magnet fixed below said first iron member, for producing a downward magnetic force to assist said first iron member in being released from said second iron member when said electromagnet is energized with the current flowing in the opposite direction.

* * * * *